US012441118B2

(12) United States Patent
Nakata et al.

(10) Patent No.: US 12,441,118 B2
(45) Date of Patent: Oct. 14, 2025

(54) LIQUID CONTAINER AND RECORDING DEVICE

(71) Applicant: SEIKO EPSON CORPORATION, Tokyo (JP)

(72) Inventors: Satoshi Nakata, Matsumoto (JP); Masanari Tanaka, Shiojiri (JP); Katsumi Yamada, Matsumoto (JP); Masahito Tatsumi, Shiojiri (JP); Matsutaro Naito, Minowa-Machi (JP)

(73) Assignee: Seiko Epson Corporation, Tokyo (JP)

( * ) Notice: Subject to any disclaimer, the term of this patent is extended or adjusted under 35 U.S.C. 154(b) by 191 days.

(21) Appl. No.: 18/176,885

(22) Filed: Mar. 1, 2023

(65) Prior Publication Data

US 2023/0278342 A1 Sep. 7, 2023

(30) Foreign Application Priority Data

Mar. 3, 2022 (JP) ................................ 2022-032374
Mar. 3, 2022 (JP) ................................ 2022-032375

(51) Int. Cl.
*B41J 2/175* (2006.01)

(52) U.S. Cl.
CPC ....... *B41J 2/17553* (2013.01); *B41J 2/17509* (2013.01)

(58) Field of Classification Search
CPC ......................... B41J 2/17553; B41J 2/17509; B41J 2/17513; B41J 2/1752; B41J 2/17523; B41J 2/1754; B41J 29/02; B41J 29/13
See application file for complete search history.

(56) References Cited

U.S. PATENT DOCUMENTS

2017/0305166 A1 10/2017 Shimamura et al.
2018/0311964 A1* 11/2018 Tanaka ................ B41J 2/17536

FOREIGN PATENT DOCUMENTS

| | | | |
|---|---|---|---|
| JP | 2017-196895 | A | 11/2017 |
| JP | 2018-183960 | A | 11/2018 |
| JP | 2021-028119 | A | 2/2021 |

* cited by examiner

*Primary Examiner* — Lisa Solomon

(74) *Attorney, Agent, or Firm* — WORKMAN NYDEGGER

(57) ABSTRACT

A liquid container is configured to be refilled with a liquid from outside, the liquid container including a containing portion that contains the liquid, an inlet that is in communication with the containing portion and through which the liquid is poured, a lid portion that has an insertion portion to be inserted into the inlet and is configured to turn around a turning axis between a closed state in which the inlet is closed by inserting the insertion portion into the inlet and an open state in which the insertion portion is separated from the inlet, and a cover portion that covers the insertion portion in the open state, in which, when the lid portion is in the open state, the insertion portion does not project further than the cover portion when viewed in an axial direction of the turning axis.

19 Claims, 24 Drawing Sheets

LIQUID CONTAINER AND RECORDING DEVICE

The present application is based on, and claims priority from JP Application Serial Number 2022-032374, filed Mar. 3, 2022 and JP Application Serial Number 2022-032375, filed Mar. 3, 2022, the disclosures of which are hereby incorporated by reference herein in their entirety.

BACKGROUND

1. Technical Field

The present disclosure relates to a liquid container and a recording device.

2. Related Art

In a printer that performs recording by ejecting ink from a recording head, a configuration including a liquid container that contains ink to be supplied to the recording head has been known. The liquid container is configured to be refilled with ink from outside through an inlet.

As a related art, a configuration in which a plug member is press-fitted to a supply opening of a liquid container so as to prevent leakage of a liquid from the liquid container has been known (see JP-A-2017-196895).

According to JP-A-2017-196895, ink in the container may be attached to a portion, of the plug member, inserted into the supply opening. Therefore, when the user refills the container with ink through the supply opening while the plug member is removed from the supply opening, a hand of the user sometimes touches the ink attached to the plug member and gets dirty.

SUMMARY

The present disclosure is a liquid container configured to be refilled with a liquid from outside, the liquid container including a containing portion that contains the liquid, an inlet that is in communication with the containing portion and through which the liquid is poured, a lid portion that has an insertion portion to be inserted into the inlet and is configured to turn around a turning axis between a closed state in which the inlet is closed by inserting the insertion portion into the inlet and an open state in which the insertion portion is separated from the inlet, and a cover portion that covers the insertion portion in the open state, in which, when the lid portion is in the open state, the insertion portion does not project further than the cover portion when viewed in an axial direction of the turning axis.

The present disclosure is a recording device including a recording unit that performs recording by ejecting a liquid onto a medium, and the liquid container that contains the liquid to be supplied to the recording unit. The present disclosure is a recording device including a recording unit that performs recording by ejecting a liquid onto a medium, and a liquid containing unit that contains the liquid to be supplied to the recording unit, in which the liquid containing unit has a first liquid container that is the liquid container, a second liquid container that is the liquid container, and a lid cover that covers the lid portion of the first liquid container and the lid portion of the second liquid container.

The present disclosure is a recording device including a recording unit that performs recording by ejecting a liquid onto a medium, a plurality of liquid containers that contains the liquid to be supplied to the recording unit, and a cover portion that covers the plurality of liquid containers, in which each of the liquid containers has a containing portion that contains a liquid, an inlet that is in communication with the containing portion and receives pouring of the liquid, a lid portion that is configured to turn around a turning axis between a closed state in which the inlet is closed by inserting an insertion portion into the inlet and an open state in which the insertion portion is separated from the inlet, the cover portion is configured to turn around an axis parallel to the turning axis, and when the lid portion is in the open state, the insertion portion does not project further than the cover portion when viewed in an axial direction of the turning axis.

DESCRIPTION OF EXEMPLARY EMBODIMENTS

Hereinafter, embodiments of the present disclosure will be described with reference to the drawings. Note that each figure is merely an example for describing the present embodiment. Since each figure is an example, the ratio and the shape may not be accurate, may not be mutually matched, and may be partially omitted.

1. Schematic Description of Device Configuration

Figure 1:
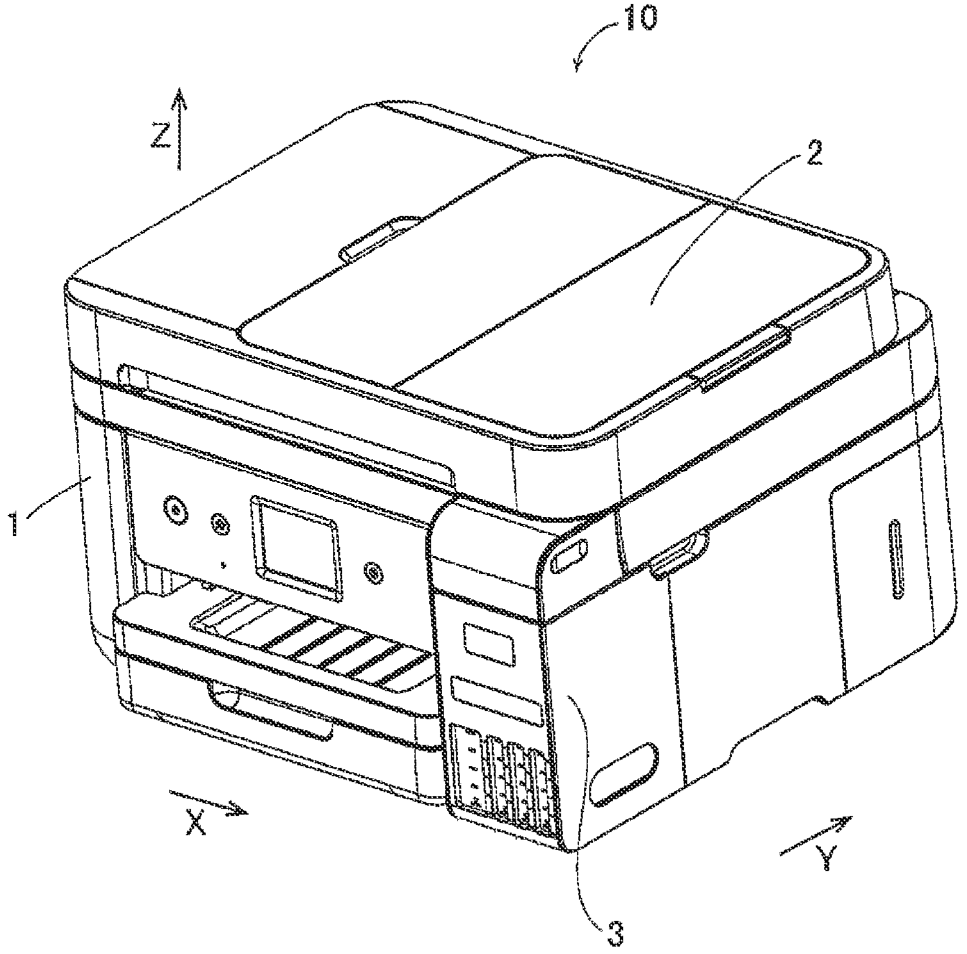
FIG. 1 is a perspective view illustrating an appearance of a recording device when a reading unit is in a closed state.
Figure 2:
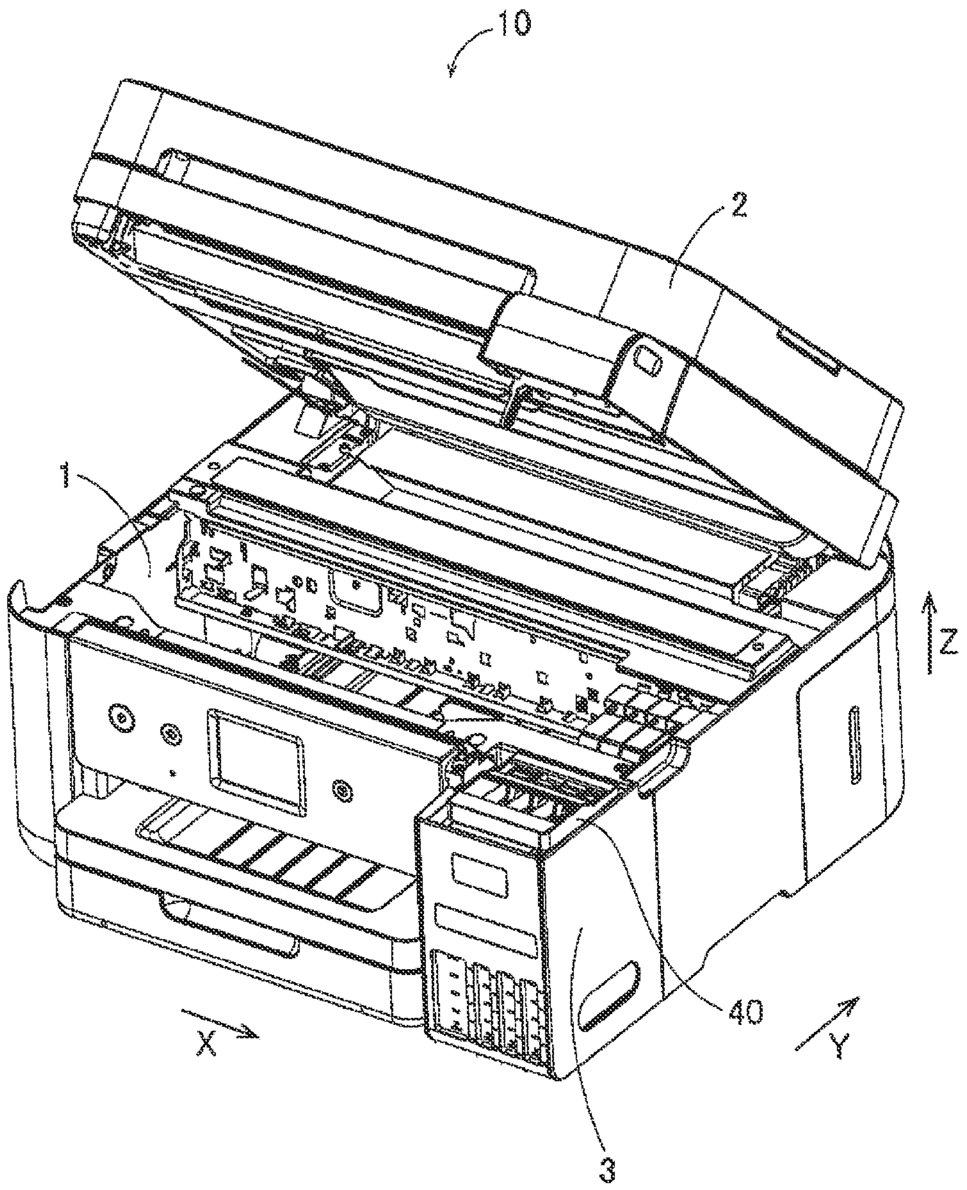
FIG. 2 is a perspective view illustrating an appearance of the recording device when the reading unit is in an open state.

FIGS. 1 and 2 illustrate the appearance of a recording device 10 according to the present embodiment in a perspective view. Assuming that the recording device 10 is placed on a horizontal plane, in the figures, an X direction is a direction directing from left to right, a Y direction is a direction directing from front to rear, and a Z direction is a direction directing from bottom to top. The X direction may be referred to as a lateral direction, the Y direction may be referred to as a depth direction, and the Z direction may be referred to as a vertical direction. The X, Y, and Z directions are orthogonal to each other.

The recording device 10 generally has a recording unit 1 and a reading unit 2. In addition, a liquid containing unit 3 is attached to the recording unit 1. The recording unit 1 is configured to perform recording by ejecting a liquid such as ink onto a medium such as paper and functions as a printer. Although the details will be omitted, the recording unit 1 is supplied with a liquid from the liquid containing unit 3 through a liquid path (not illustrated) and ejects the liquid from a nozzle by using an ink jet system to perform recording. The reading unit 2 is a scanner configured to optically read a document and has a document platen, a light source, an image sensor for reading, and the like. The details of the reading unit 2 will also be omitted.

Since the recording device 10 has the recording unit 1 and the reading unit 2, the recording device 10 can be referred to as a multifunction device. Needless to say, the recording device 10 as a multifunction device may be a product having more functions such as a facsimile function and an electronic mail communication function in addition to the recording unit 1 and the reading unit 2. The reading unit 2 also functions as a lid that opens and closes above the recording unit 1. In FIG. 1, the reading unit 2 is in a closed state with respect to the recording unit 1, and in FIG. 2, the reading unit 2 is in an open state with respect to the recording unit 1. As illustrated in FIG. 2, the user flips the reading unit 2 up to open the reading unit 2 and refills the liquid containing unit 3 with a liquid. Note that the recording device 10 does not have to include the reading unit 2. That is, the recording device 10 does not have to be a multifunction device. In some cases, the recording unit 1 that performs recording using an ink jet system has a so-called carriage that is mounted with a recording head having a plurality of nozzles and reciprocates. In each figure, the liquid containing unit 3 is not mounted on the carriage, but the liquid containing unit 3 may be mounted on the carriage.

Figure 3:
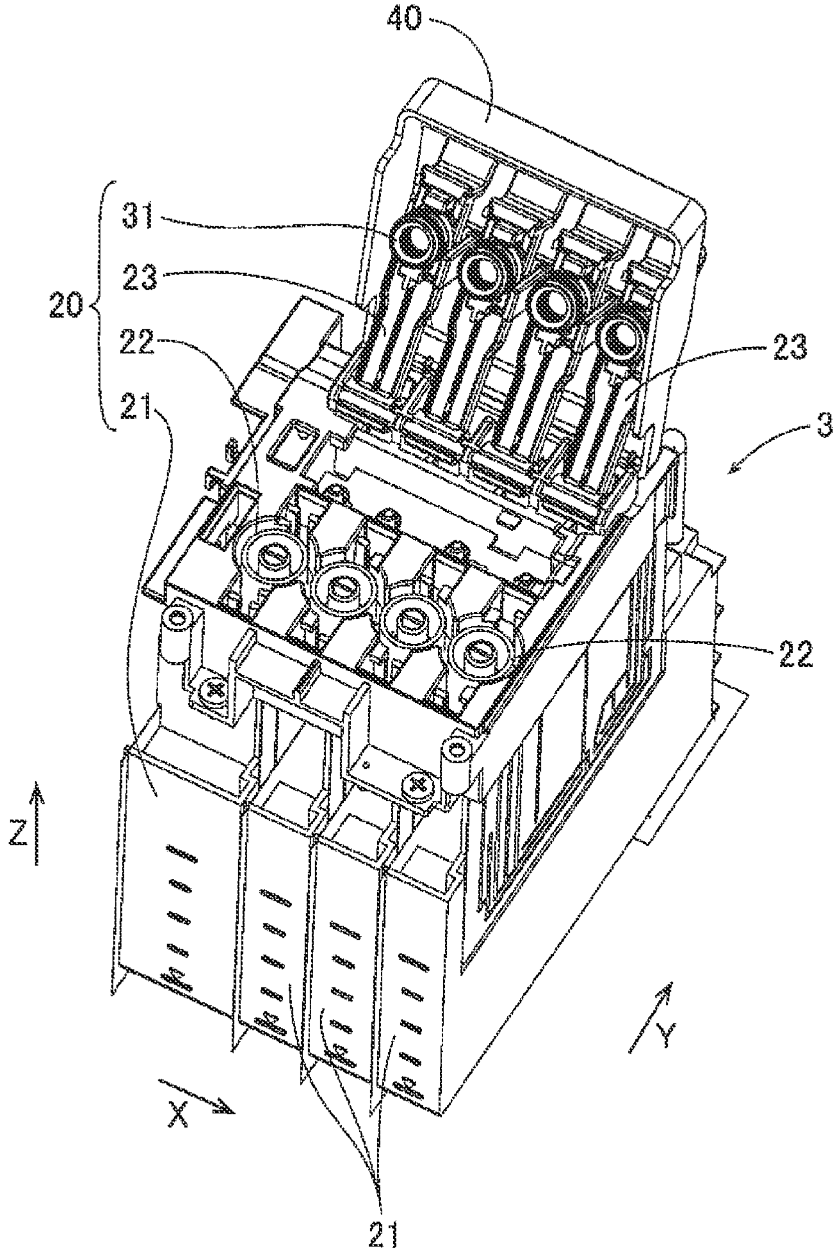
FIG. 3 is a perspective view illustrating a liquid containing unit when a lid portion is in an open state.

FIG. 3 is a perspective view illustrating the liquid containing unit 3. The liquid containing unit 3 is a collection of a plurality of liquid containers 20. One liquid container 20 has a containing portion 21 that contains the liquid, an inlet 22 that is in communication with the containing portion 21 and receives pouring of the liquid, and a lid portion 23. The lid portion 23 is configured to be displaced between a closed state in which the inlet 22 is closed by inserting an insertion portion 31 into the inlet 22 and an open state in which the insertion portion 31 is separated from the inlet 22. The open state of the lid portion 23 includes, due to the structure of the lid portion 23, not only a state in which the insertion portion 31 is separated to the maximum degree from the inlet 22, but also a state in which the insertion portion 31 is separated from the inlet 22 at a position closer to the inlet 22 from the state in which the insertion portion 31 is separated to the maximum degree from the inlet 22. In FIG. 3, the lid portion 23 is in the open state. The user can refill the containing portion 21 with the liquid through the inlet 22 by displacing the lid portion 23 such that the lid portion 23 enters the open state. One containing portion 21 contains one kind of liquid.

In the example of FIG. 3, since four containing portions 21 are arranged in the X-axis direction, the liquid containing unit 3 contains, for example, four colors of ink, which are cyan, magenta, yellow, and black (CMYK). Needless to say, the number of the liquid containers 20 constituting the liquid containing unit 3 is not limited to four. One liquid container 20 included in the liquid containing unit 3 may be referred to as a first liquid container, and another liquid container 20, which is different from the first liquid container among the liquid containers 20 included in the liquid containing unit 3, may be referred to as a second liquid container. The liquid contained in the containing portion 21 is ink in most cases, but, for example, liquids other than ink such as a coating liquid or a reaction liquid may be contained. The liquid is supplied from each liquid container 20 to the recording unit 1.

Figure 4:
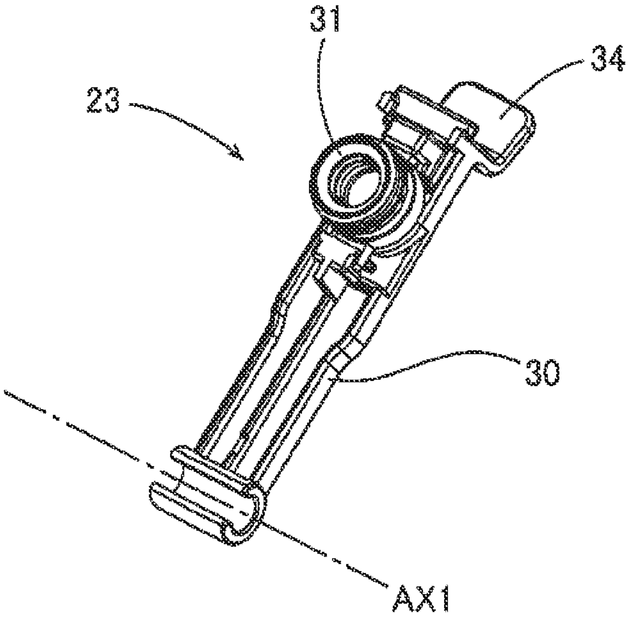
FIG. 4 is a perspective view illustrating an example of the lid portion.

FIG. 4 is a perspective view illustrating an example of the lid portion 23. The lid portion 23 has a lever 30 having an elongated shape and the insertion portion 31 projecting from a portion near a tip of the lever 30. The lever 30 is pivotally supported by a turning axis AX1 at an end on a side opposite to the tip and is configured to turn around the turning axis AX1. The turning axis AX1 is an axis parallel to the X direction. In the present embodiment, being parallel is not limited to being exactly parallel and includes an angle error that can be generated in a product. In the liquid container 20, the turning axis AX1 is provided behind the inlet 22, and the lid portion 23 is displaced to enter the closed state and the open state by turning around the turning axis AX1.

The insertion portion 31 is formed of an elastic material such as rubber or elastomer and is inserted into the inlet 22 so as to prevent leakage of the liquid from the inlet 22. The insertion portion 31 may be referred to as a plug or a cap. At least part of the insertion portion 31 is inserted into the inside of the inlet 22. At the tip of the lever 30, an operation piece 34 having a shape easily operated with a finger of the user may be formed.

As illustrated in FIG. 3, the liquid containing unit 3 may have a lid cover 40 that is configured to cover a plurality of lid portions 23 all at once, behind the lid portions 23 of the liquid containers 20. The lid cover 40 is configured to turn around an axis parallel to the turning axis AX1. The lid cover 40 is also displaced by the user. The lid cover 40 is provided basically for the purpose of improving the appearance of the liquid containing unit 3, preventing incomplete fitting of each lid portion 23 into each inlet 22, and the like. That is, as the lid cover 40 presses the lid portions 23 all at once, the incomplete fitting of the insertion portion 31 of each lid portion 23 into each inlet 22 is easily solved. The configurations illustrated in FIGS. 3 and 4 are examples for a description of the present embodiment, and in particular, the configurations of the lid portion 23 and the lid cover 40 may be different from those of each embodiment described later.

2. Description of Cover Portion Covering Insertion Portion

Hereinafter, first to third embodiments will be described regarding a cover portion that covers the insertion portion 31 in the liquid container 20. The liquid container 20 includes a cover portion that covers the insertion portion 31 when the lid portion 23 is in the open state. When the lid portion 23 is in the open state, the insertion portion 31 does not project further than the cover portion when viewed in an axial direction of the turning axis AX1. In the present embodiment, "covering" means covering a portion such that at least part of the portion is covered. For example, the portion may be covered only in a direction in which the user easily touches the portion. In addition, "covering the insertion portion 31 when the lid portion 23 is in the open state" does not mean to prohibit covering of the insertion portion 31 when the lid portion 23 is in the closed state.

First Embodiment

Figure 5:
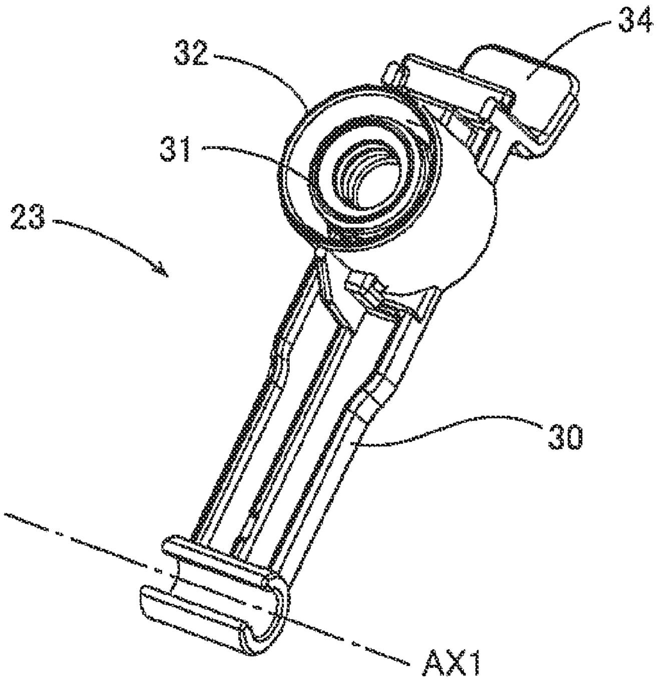
FIG. 5 is a perspective view illustrating a lid portion of a first embodiment.

FIG. 5 is a perspective view illustrating the lid portion 23 according to the first embodiment. The lid portion 23 illustrated in FIG. 5 is different from that of FIGS. 3 and 4 in that a cover portion 32 is provided. According to FIG. 5, the cover portion 32 having a cylindrical shape projects further than the insertion portion 31 from the lever 30 so as to cover the outer periphery of the insertion portion 31. That is, when viewed from the axial direction of the turning axis AX1, the cover portion 32 projects further than the insertion portion 31. A gap is secured between the insertion portion 31 and the cover portion 32. The cover portion 32 is formed of the same resin material as the lever 30. That is, in FIG. 5, the cover portion 32 is part of the lever 30.

Figure 6:
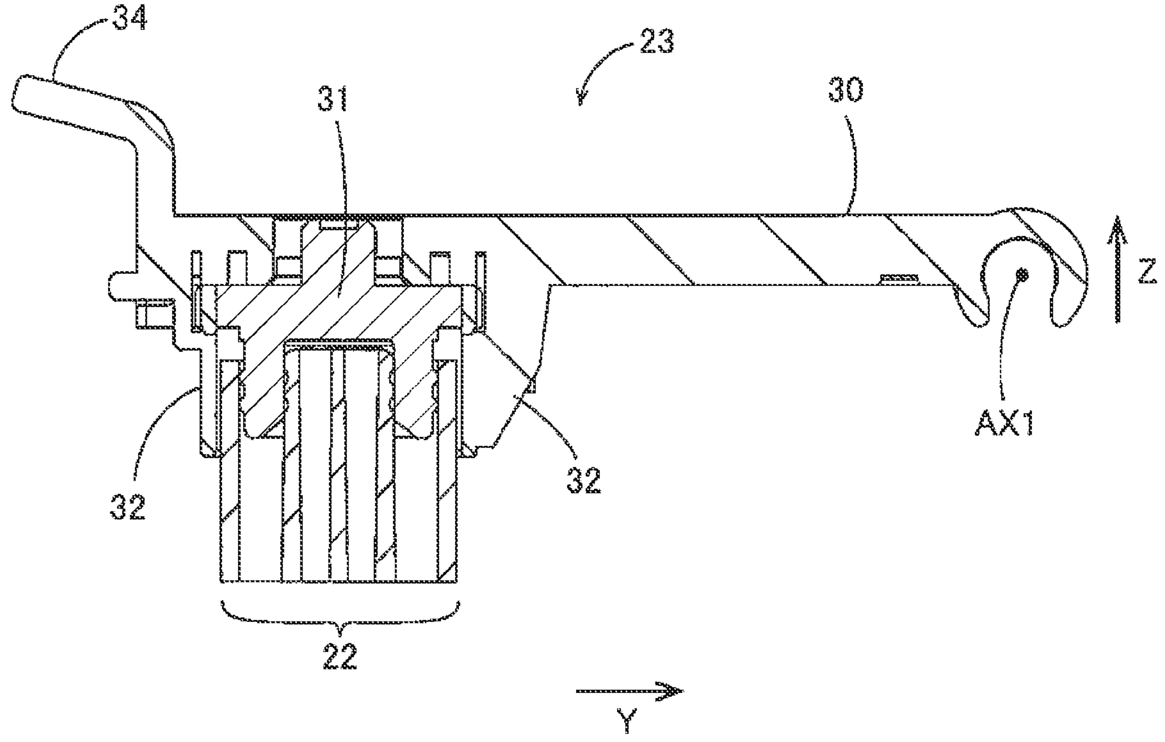
FIG. 6 is a sectional view illustrating a structure when the lid portion of the first embodiment is in a closed state.

FIG. 6 is a sectional view in a plane orthogonal to the X direction illustrating a structure when the lid portion 23 according to the first embodiment is in the closed state. According to FIG. 6, a tip of the insertion portion 31 is inserted into the inlet 22 and closes the inlet 22. Therefore, the liquid can be attached to the insertion portion 31. In addition, a tip of the inlet 22 is inserted into the gap between the insertion portion 31 and the cover portion 32. Since the liquid is not attached to the outer peripheral surface of the inlet 22, as illustrated in FIG. 6, even when the insertion portion 31 and the cover portion 32 are fitted to the inlet 22, the liquid is not attached to the cover portion 32.

Therefore, during operation in which the user displaces the lid portion 23 from the state in FIG. 6 to the open state and pours the liquid through the inlet 22, even if a hand of the user comes close to the insertion portion 31, the cover portion 32 suppress a contact with the insertion portion 31 so that the hand of the user does not get dirty. According to FIG. 6, the cover portion 32 projects further than the insertion portion 31. That is, even when the lid portion 23 is in the closed state, the insertion portion 31 does not project further than the cover portion 32 when viewed in the axial direction of the turning axis AX1.

Figure 7:
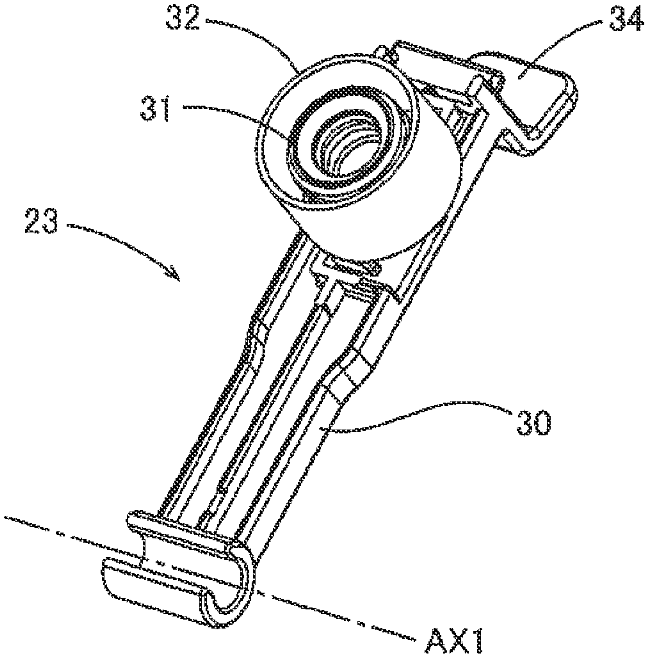
FIG. 7 is a perspective view illustrating another example of the lid portion of the first embodiment.

FIG. 7 is a perspective view illustrating another example of the lid portion 23 of the first embodiment different from that of FIG. 5. In FIG. 7, the difference from FIG. 5 will be described. In the example of FIG. 7, the cover portion 32 is integrally formed with the insertion portion 31 by using the same material as the insertion portion 31. That is, the cover portion 32 and the insertion portion 31, which are an integrated member, are attached to the lever 30. The example of FIG. 7 is the same as the example of FIGS. 5 and 6 in that the cover portion 32 projects further than the insertion portion 31 in both of the open state and the closed state of the lid portion 23. Note that the cover portion 32 may be formed of a different material from both of the lever 30 and the insertion portion 31 as a separate body.

Second Embodiment

The insertion portion 31 may project further than the cover portion 32 when viewed in the axial direction of the turning axis AX1, when the lid portion 23 is in the closed state. In the configuration in which the cover portion 32 projects further than the insertion portion 31 in the closed state of the lid portion 23, it is necessary to secure a space so that the cover portion 32 can exist around the inlet 22 without interfering with an area surrounding the containing portion 21 and the like, and the size of the product may be increased. Therefore, in the second embodiment, adopting a configuration in which the insertion portion 31 projects further than the cover portion 32 in the closed state of the lid portion 23 contributes to reducing the size of the product.

Figure 8:
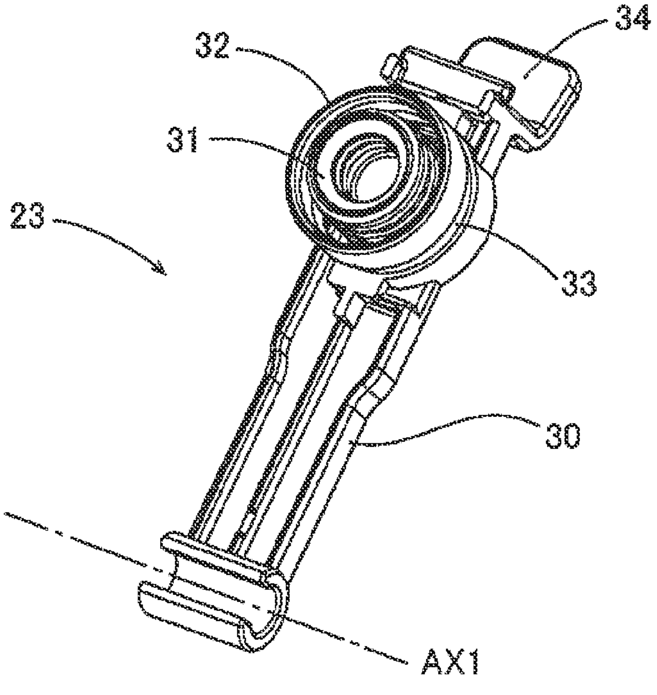
FIG. 8 is a perspective view illustrating a lid portion of a second embodiment.

FIG. 8 is a perspective view illustrating the lid portion 23 according to the second embodiment. The lid portion 23 illustrated in FIG. 8 is different from the lid portion 23 in FIG. 5 in that the cover portion 32 is attached to the lever 30 with a biasing member 33 interposed therebetween. The biasing member 33 is, for example, a compression spring. A position of the cover portion 32 when the insertion portion 31 does not project further than the cover portion 32 is referred to as a first position, and a position of the cover portion 32 when the insertion portion 31 projects further than the cover portion 32 is referred to as a second position. The cover portion 32 is configured to be displaced between the first position and the second position by expansion and contraction of the biasing member 33, and the biasing member 33 biases the cover portion 32 toward the first position. Note that the biasing member 33 is not limited to a spring and may be an elastic member such as rubber.

Figure 9A:
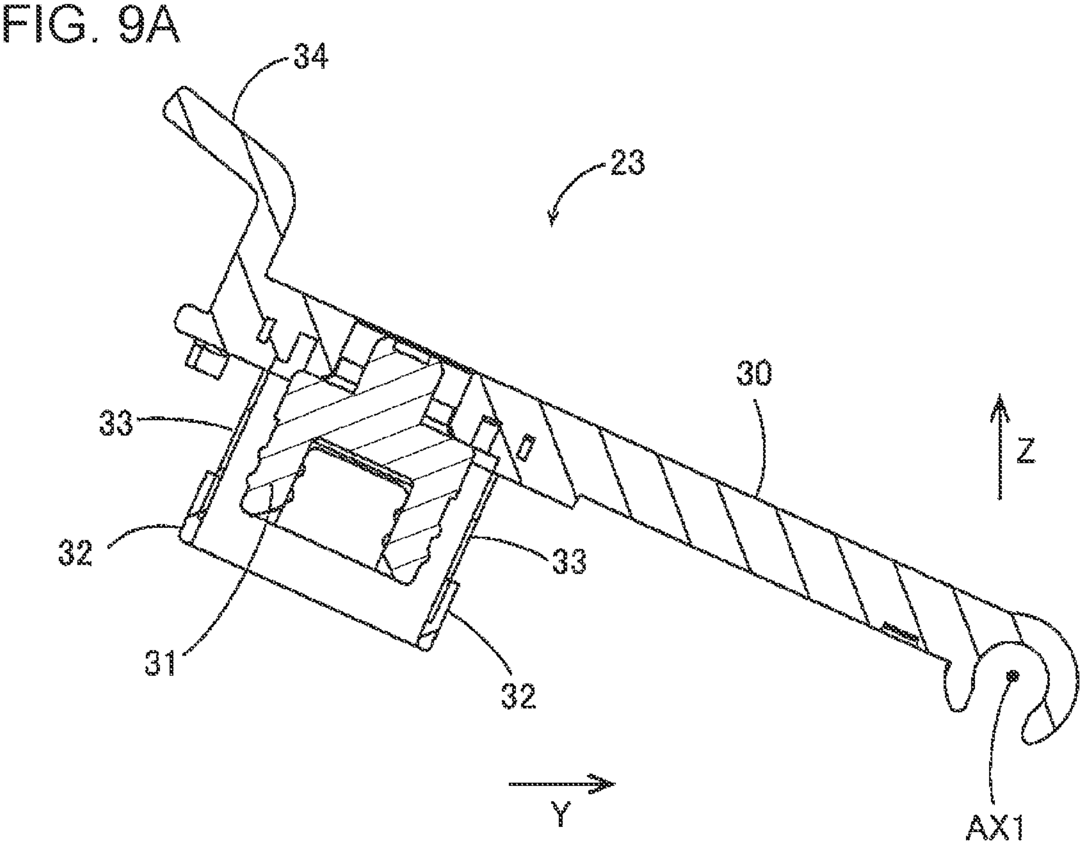
FIG. 9A is a sectional view illustrating a structure when the lid portion of the second embodiment is in the open state.
Figure 9B:
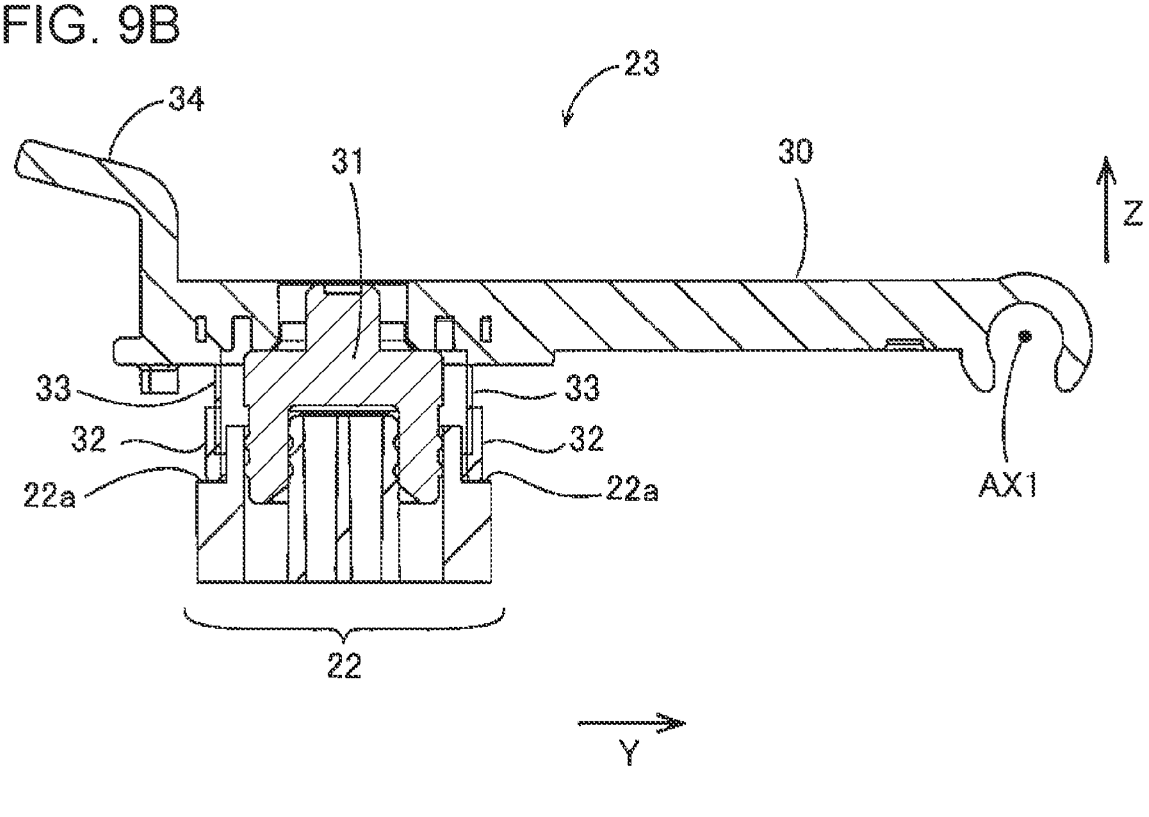
FIG. 9B is a sectional view illustrating a structure when the lid portion of the second embodiment is in the closed state.

FIG. 9A is a sectional view in a plane orthogonal to the X direction illustrating a structure when the lid portion 23 according to the second embodiment is in the open state, and FIG. 9B is a sectional view in a plane orthogonal to the X direction illustrating a structure when the lid portion 23 according to the second embodiment is in the closed state. As illustrated in FIG. 9A, when the lid portion 23 is in the open state, the cover portion 32 projects further than the insertion portion 31 by the biasing force of the biasing member 33 and is located at the first position. That is, similarly to the first embodiment, in the second embodiment, in the open state of the lid portion 23, the cover portion 32 suppresses a contact of the user with the insertion portion 31.

On the other hand, according to FIG. 9B, similarly to FIG. 6, the tip of the insertion portion 31 is inserted into the inlet 22 and closes the inlet 22, and the tip of the inlet 22 is inserted into the gap between the insertion portion 31 and the cover portion 32. However, in FIG. 9B, the tip of the cover portion 32 abuts on a step 22*a* formed below the tip of the inlet 22 and pressed on the outer peripheral surface of the inlet 22, and the biasing member 33 is compressed compared to FIG. 9A. As a result, in FIG. 9B, the cover portion 32 does not project further than the insertion portion 31 and is located at the second position.

Third Embodiment

Figure 10:
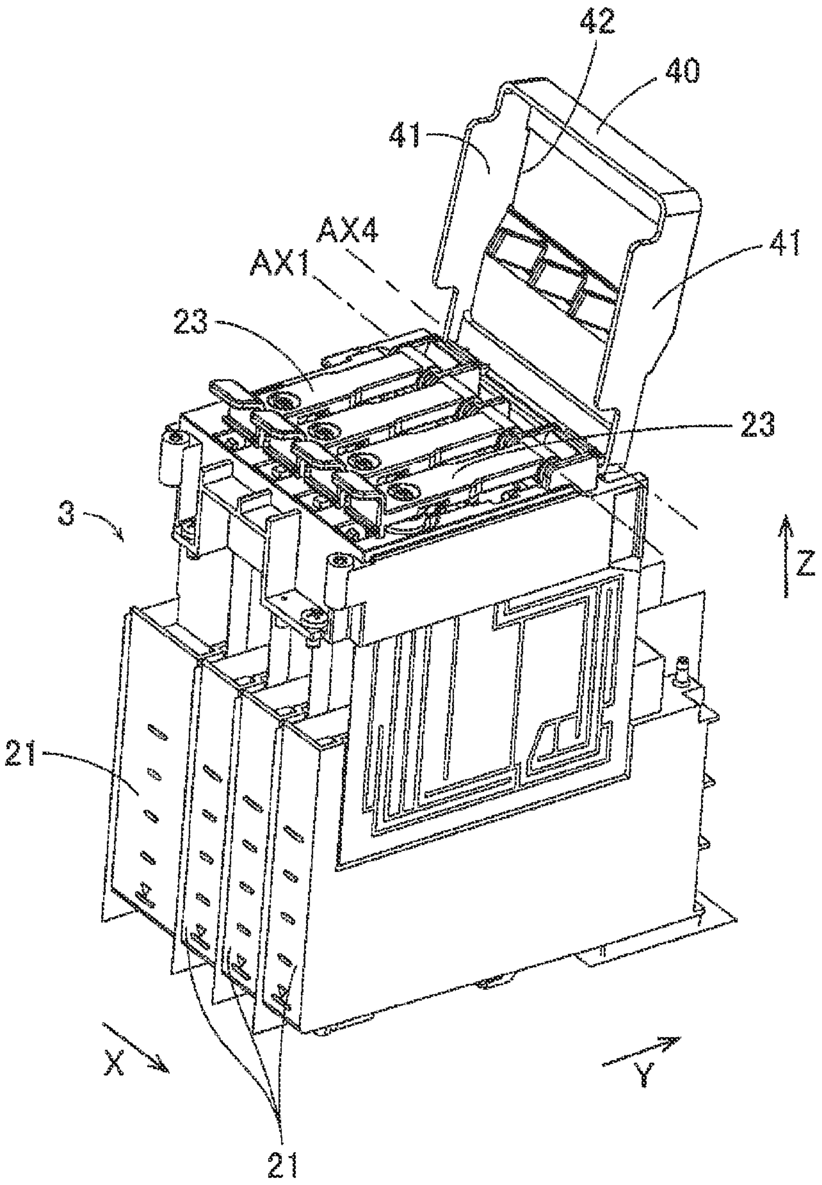
FIG. 10 is a perspective view illustrating the liquid containing unit when the lid portion is in the closed state.

In the third embodiment, unlike the first embodiment and the second embodiment, the lid cover 40 is considered to be a cover portion that covers the insertion portion 31 in the open state of the lid portion 23. In the third embodiment, the cover portion 32 provided in the lid portion 23 described in the first embodiment and the second embodiment may be provided or does not have to be provided. In FIG. 10 and the following figures, the cover portion 32 is not described.

FIG. 10 is a perspective view illustrating the liquid containing unit 3. The cover portion of the third embodiment, that is, the lid cover 40 is configured to open and close with respect to the containing portion 21 by turning around a turning axis AX4, which is an axis parallel to the turning axis AX1. The turning axis AX4 is located behind the turning axis AX1. In FIG. 10, unlike FIG. 3, each lid portion 23 is in the closed state. The lid cover 40 is raised in both FIGS. 3 and 10 and is in an open state. Note that, in the example of FIG. 2, the lid cover 40 covers the lid portion 23 that is in the closed state from above, which means that the lid cover 40 is in a closed state.

According to FIG. 10, the lid cover 40 has side walls 41, at the left and right ends, that project forward when the lid cover 40 is in the open state. The left side wall 41 can cover the leftmost lid portion 23 from the left, and the right side wall 41 can cover the rightmost lid portion 23 from the right. In addition, part, of the lid cover 40, of a surface that faces forward when the lid cover 40 is in the open state is cut away to form a window 42.

Figure 11:
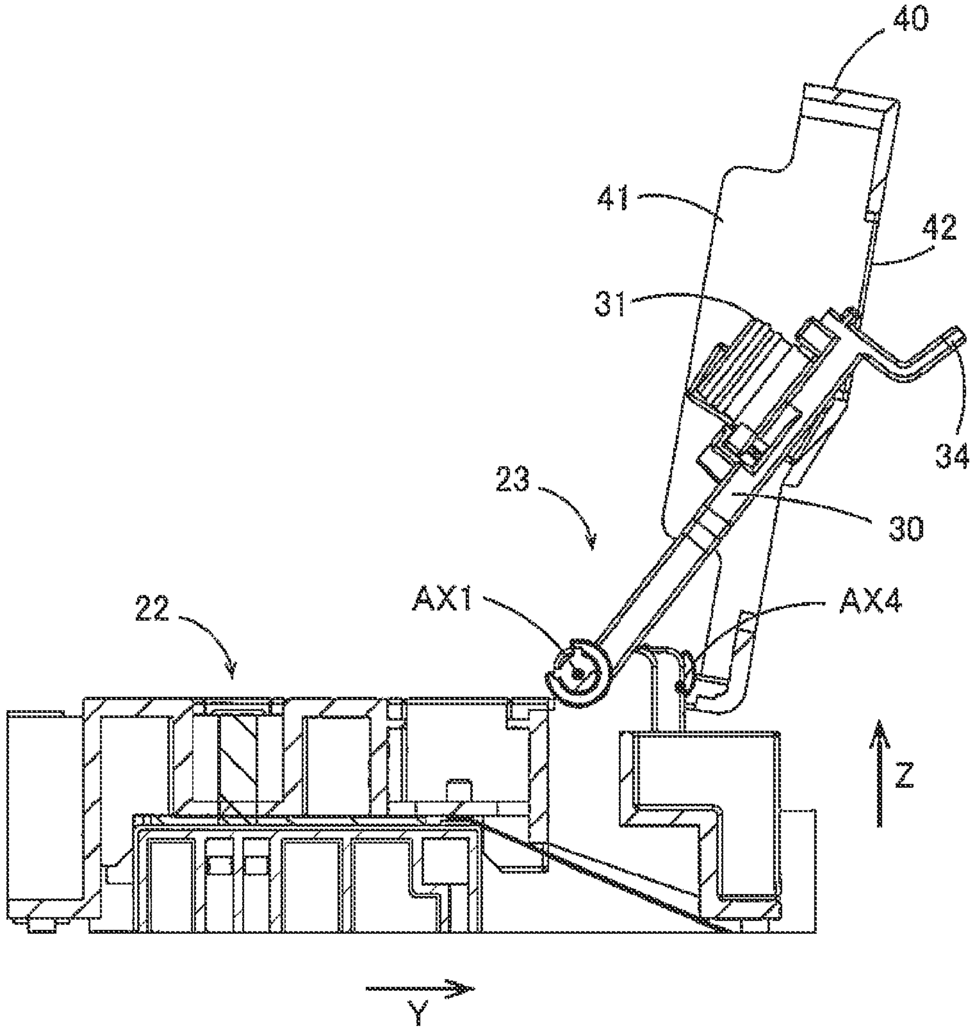
FIG. 11 is a view illustrating a relationship between a lid cover and a lid portion of a third embodiment.

FIG. 11 illustrates a relationship between the lid cover 40 and the lid portion 23 when viewed in a direction directing the axial direction of the turning axis AX1. FIG. 11 is a sectional view illustrating part of the lid cover 40 and the like. According to FIG. 11, the lid portion 23 and the lid cover 40 are both in the open state. Specifically, in the orientation of the lid portion 23 of FIG. 11, the insertion portion 31 is separated to the maximum degree from the inlet 22, and at this time, the operation piece 34 projects backward through the window 42 of the lid cover 40. In addition, the insertion portion 31 does not project further than the side wall 41 of the lid cover 40 and is covered with the lid cover 40. Note that in FIG. 11, one lid cover 40 covers a plurality of lid portions 23, but one lid cover 40 may cover one lid portion 23 with the side wall 41 and the like.

According to the third embodiment described above, the insertion portion 31 of the lid portion 23 in the open state does not project further than the lid cover 40, during operation in which the user pours the liquid through the inlet 22, the lid cover 40 serves as a guard, and the hand of the user hardly comes into contact with the insertion portion 31. In addition, according to FIG. 11, the window 42 releases the operation piece 34 at the tip of the lid portion 23 to the outside of the lid cover 40, and thus the insertion portion 31 is placed inside the lid cover 40 such that the insertion portion 31 does not project further than the side wall 41 without making the side wall 41 huge as much as possible. However, a configuration in which the entire lid portion 23 does not project outside the lid cover 40 may be adopted. In FIG. 11, the lid portion 23 in the open state may be supported by the lid cover 40 from behind, or the orientation of the lid portion 23 may be maintained by a prescribed stopper other than the lid cover 40.

3. Summary

As described above, according to the above embodiment, the liquid container 20 configured to be refilled with a liquid from outside includes the containing portion 21 that contains the liquid, the inlet 22 that is in communication with the containing portion 21 and through which the liquid is poured, the lid portion 23 that has the insertion portion 31 to be inserted into the inlet 22 and is configured to turn around the turning axis AX1 between the closed state in which the inlet 22 is closed by inserting the insertion portion 31 into the inlet 22 and the open state in which the insertion portion 31 is separated from the inlet 22, and the cover portion that covers the insertion portion 31 in the open state of the lid portion 23. In addition, when the lid portion 23 is in the open state, the insertion portion 31 does not project further than the cover portion when viewed in the axial direction of the turning axis AX1.

According to the configuration, when the lid portion 23 is in the open state, the insertion portion 31 does not project further than the cover portion when viewed in the axial direction of the turning axis AX1. Therefore, during operation in which the user pours the liquid through the inlet 22, the cover portion suppresses a contact of the hand of the user with the insertion portion 31 so that the hand of the user does not get dirty.

More specifically, when the user supplies the liquid, the user removes the insertion portion 31 from the inlet 22 and installs a bottle containing a refill liquid into the inlet 22. For the bottle, a bottle 50 illustrated in FIG. 16 described later should be referred to, as necessary. When the bottle is raised with respect to the inlet 22, the insertion portion 31 that has been removed from the inlet 22 is hidden by the bottle and is hardly seen from the user. Therefore, in the related art, the hand of the user holding the bottle often touches the insertion portion 31 and gets dirty. In the above embodiment, by providing the cover portion, the phenomenon in which the hand of the user gets dirty as described above can be suppressed.

In addition, according to the above embodiment, the cover portion 32 may be provided in the lid portion 23. In the configuration, by providing the cover portion 32 in the lid portion 23, a contact with the insertion portion 31 can be effectively suppressed. In addition, the configuration including the cover portion can be simplified.

In addition, according to the above embodiment, a configuration in which, even when the lid portion 23 is in the closed state, the insertion portion 31 does not project further than the cover portion 32 when viewed in the axis direction of the turning axis AX1, may be adopted. According to the configuration, in both of the open state and the closed state of the lid portion 23, the insertion portion 31 is covered so as not to project further than the cover portion 32. Therefore, when the insertion portion 31 is removed from the inlet 22, scattering of the liquid attached to the insertion portion 31 therearound can be suppressed.

On the other hand, when the lid portion 23 is in the closed state, the insertion portion 31 may project further than the cover portion 32 when viewed in the axial direction of the turning axis AX1. According to the configuration, as described above, the configuration contributes to reducing the size of the product.

In addition, according to the above embodiment, the cover portion 32 may be provided in the lid portion 23 with the biasing member 33 interposed therebetween and may be configured to be displaced by expansion and contraction of the biasing member 33 between the first position where the insertion portion 31 does not project further than the cover portion 32 and the second position where the insertion portion 31 projects further than the cover portion 32, and the biasing member 33 may bias the cover portion 32 toward the first position. According to the configuration, by expansion and contraction of the biasing member 33, the cover portion 32 can be easily located at the first position in the open state of the lid portion 23, and the cover portion 32 can be easily located at the second position in the closed state of the lid portion 23. In addition, when the groove of the gap between the cover portion 32 and the insertion portion 31 is deep, in a case where ink dregs adhere to the gap, it is difficult to clean the groove. However, since the biasing member 33 is provided, the biasing member 33 is contracted so as to make the groove shallow, and thus the cleaning can be easily performed. Moreover, by the biasing force of the biasing member 33, the operation of the user for displacing the lid portion 23 from the closed state to the open state can be easily performed.

In addition, the above embodiment discloses not only the liquid container 20, but also a device having the liquid container 20. That is, according to the above-described embodiment, the recording device 10 including the recording unit 1 that performs recording by ejecting a liquid onto a medium, and the liquid container 20 that contains the liquid to be supplied to the recording unit 1 can be understood.

The recording device 10 may also have a plurality of liquid containers 20. Therefore, according to the above embodiment, the recording device 10 including the recording unit 1 that performs recording by ejecting a liquid onto a medium, and the liquid containing unit 3 that contains the liquid to be supplied to the recording unit 1, in which the liquid containing unit 3 has the first liquid container and the second liquid container as the liquid containers 20, and the lid cover 40 that covers the lid portion 23 of the first liquid container and the lid portion 23 of the second liquid container can be understood. According to the configuration, by the lid cover 40, an aesthetic appearance of a portion near a plurality of lid portions 23 can be improved, and incomplete fitting of each lid portion 23 into each inlet 22 can be prevented.

In the above embodiment, the cover portion may be configured to open and close with respect to the containing portion 21 by turning around an axis parallel to the turning axis AX1. That is, the lid cover 40 may be the cover portion. By providing the cover portion as a different body from the lid portion 23, like the lid cover 40, a phenomenon in which ink dregs accumulate between the insertion portion 31 and the cover portion can be avoided.

Moreover, from the configuration in which the lid cover 40 is the cover portion, the recording device 10 including the recording unit 1 that performs recording by ejecting a liquid onto a medium, and a plurality of liquid containers 20 that contains the liquid to be supplied to the recording unit 1 can be understood. That is, the recording device 10 includes the cover portion that covers the plurality of liquid containers 20, each of the liquid containers 20 has the containing portion 21 that contains the liquid, the inlet 22 that is in communication with the containing portion 21 and receives pouring of the liquid, and the lid portion 23 that is configured to turn around the turning axis AX1 between the closed state in which the inlet 22 is closed by inserting the insertion portion 31 into the inlet 22 and the open state in which the insertion portion 31 is separated from the inlet 22, the cover portion is configured to turn around an axis parallel to the turning axis AX1, and when the lid portion 23 is in the open state, the insertion portion 31 does not project further than the cover portion when viewed in the axial direction of the turning axis AX1. According to the configuration, by providing one cover portion for the plurality of lid portions 23, a cover portion that does not allow the insertion portion 31 to project in the open state of the lid portion 23 can be realized.

The liquid container 20 may further include a lock portion that holds the lid portion 23 in the closed state. There are various specific examples of the lock portion. For example, a configuration in which the outer diameter of the insertion portion 31 is made larger than the inner diameter of the inlet 22 with a prescribed ratio or more so that the insertion portion 31 hardly comes off the inlet 22 also serves as the lock portion. In addition, a mechanism in which the lever 30 is engaged with the containing portion 21, separately from the relationship between the insertion portion 31 and the inlet 22, also corresponds to the lock portion. For example, a projection such as a pin and a hole that accepts the projection provided in the relationship between the lever 30 and the containing portion 21 can configure the lock portion. The user locks the closed state of the lid portion 23 by engaging the projection with the hole while the lid portion 23 is in the closed state. On the other hand, after the engagement of the projection with the hole is released, the user displaces the lid portion 23 from the closed state to the open state. Alternatively, as illustrated in FIG. 2, the lid cover 40 that covers the lid portion 23 from above that is in the closed state can also be considered to be the lock portion. Providing the lock portion can prevent the lid portion 23 in the closed state from unintentionally entering the open state.

4. Description of Structure for Holding Insertion Portion Directing Downward

When the lid portion 23 is in the open state, the liquid container 20 can hold the orientation of the lid portion 23 such that a projecting direction in which the insertion portion 31 projects in the lid portion 23 directs downward. For a structure for achieving the above orientation, fourth to sixth embodiments will be described. Features of the cover portion and the lock portion described thus far can be naturally combined with each embodiment to be described below and is included in the disclosed scope by the specification. The turning axis AX1 described thus far corresponds to a first turning axis, and the turning axis AX4 described thus far corresponds to a fourth turning axis. Note that in the process of causing the lid portion 23 to have an orientation so that the projecting direction directs downward, a state in which the projecting direction does not direct downward may be temporarily generated. In addition, the projecting direction directing downward includes not only a vertically downward direction, but also a downward direction relative to a horizontal plane.

Fourth Embodiment

Figure 12:
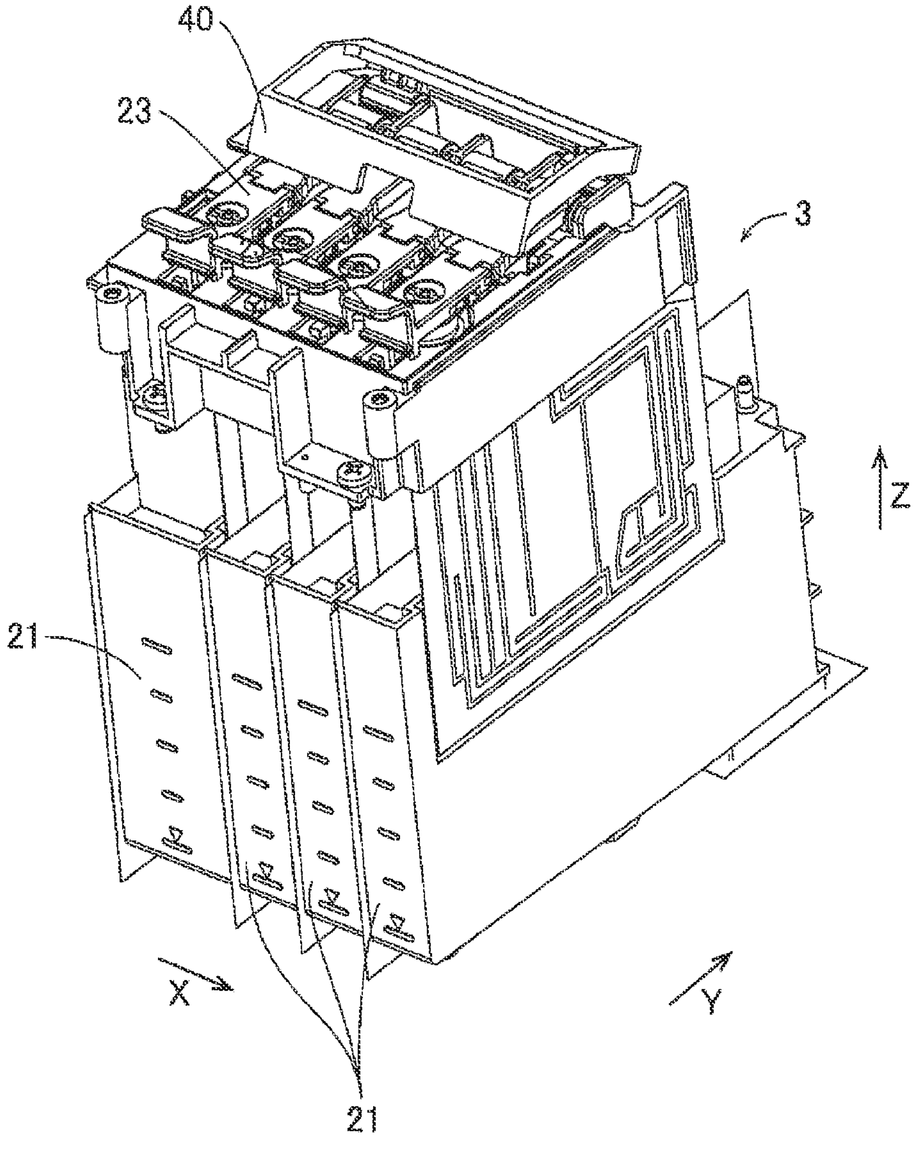
FIG. 12 is a perspective view illustrating a liquid containing unit of a fourth embodiment when a lid portion and a lid cover are in the closed state.

FIG. 12 is a perspective view illustrating the liquid containing unit 3 according to the fourth embodiment. According to FIG. 12, the lid portion 23 and the lid cover 40 are both in the closed state. Compared to the lid cover 40 illustrated in FIGS. 2, 3, 10, and 11, the lid cover 40 of the fourth embodiment has a low height when the lid cover 40 is raised. Therefore, in the closed state, the lid cover 40 of the fourth embodiment does not reach the position of the insertion portion 31 of the lid portion 23. However, the lid cover 40 may have the same configuration as the lid cover 40 illustrated in FIGS. 2, 3, 10, and 11. In addition, the lid cover 40 does not have to be provided.

Figure 13:
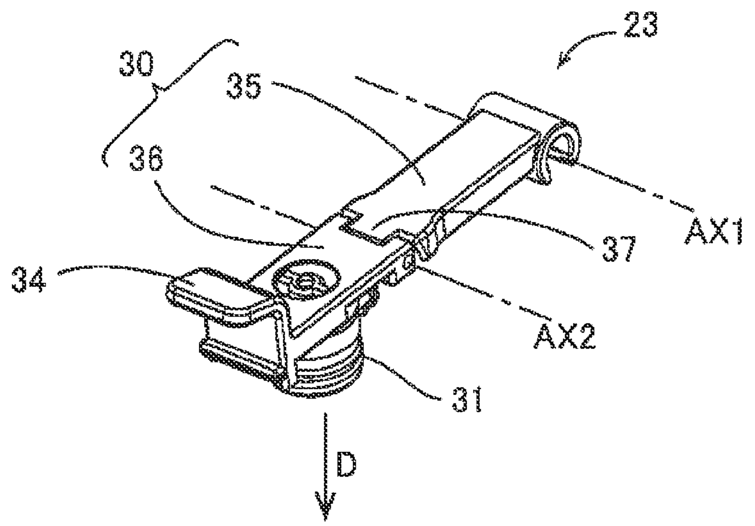
FIG. 13 is a perspective view illustrating the lid portion of the fourth embodiment.

FIG. 13 is a perspective view illustrating the lid portion 23 according to the fourth embodiment. In the lid portion 23 of the fourth embodiment, the lever 30 is divided into a first member 35 and a second member 36. The first member 35 is supported by the turning axis AX1 and is configured to turn around the turning axis AX1. The second member 26 is located closer to the tip than is the first member 35 has the insertion portion 31 and the operation piece 34.

Figure 14:
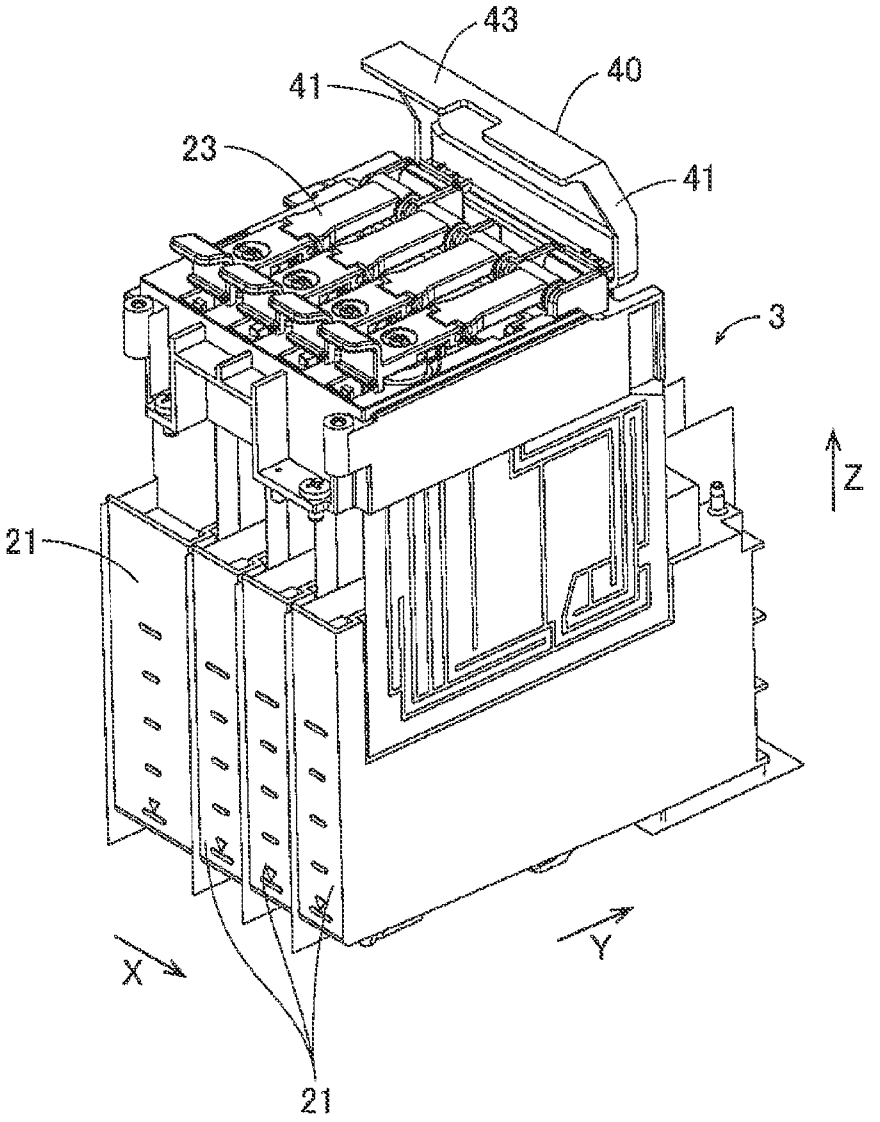
FIG. 14 is a perspective view illustrating the liquid containing unit of the fourth embodiment when the lid portion is in the closed state and the lid cover is in the open state.

A turning axis AX2 parallel to the turning axis AX1 is interposed between the first member 35 and the second member 36, and the first member 35 and the second member 36 are configured to turn with respect to the turning axis AX2. The turning axis AX2 corresponds to a second turning axis. Therefore, the lever 30 is configured to be bent using the turning axis AX2 as a boundary. In FIGS. 12 and 13, and FIG. 14 described later, the lid portion 23 is not bent. The orientation of the lid portion 23 that is not bent is referred to as a straight line orientation. On the other hand, the orientation of the lid portion 23 that is bent is referred to as a bent orientation.

In FIG. 13, a projecting direction D indicates a direction in which the insertion portion 31 projects in the lid portion 23. The projecting direction D is a direction using the lever 30 of the lid portion 23 as a reference. Therefore, as the angle of the lever 30 with respect to the turning axis AX1 changes, the direction of the projecting direction D also changes. Moreover, in the fourth embodiment, as the angle of the second member 36 with respect to the turning axis AX2 changes, the direction of the projecting direction D also changes. As is understood from the figure, the projecting direction D intersects the turning axes AX1 and AX2 and are specifically orthogonal. Similarly to the descriptions thus far, the lid portion 23 described above is configured to turn around the turning axis AX1 between the closed state and the open state. In the closed state of the lid portion 23, the projecting direction D is vertically downward.

On the surface, of the lever 30, on a side from which the insertion portion 31 does not project, an end portion of the first member 35 facing the second member 36 has a regulating portion 37 that extends toward the second member 36. The regulating portion 37 prohibits the surface, of the second member 36, on a side from which the insertion portion 31 does not project from being bent inward. Therefore, the lever 30 is bent to a side where the tip of the insertion portion 31 approaches the first member 35 by using the turning axis AX2 as a boundary. When the user lifts the lid portion 23 while holding the operation piece 34 of the lid portion 23, by the action of the regulating portion 37, the lever 30 is easily bent so that the surface, of the second member 36, on a side from which the insertion portion 31 projects, faces inward. Therefore, the regulating portion 37 is a kind of a regulating portion that regulates the orientation of the second member 36 so that the projecting direction D directs downward.

Figure 15:
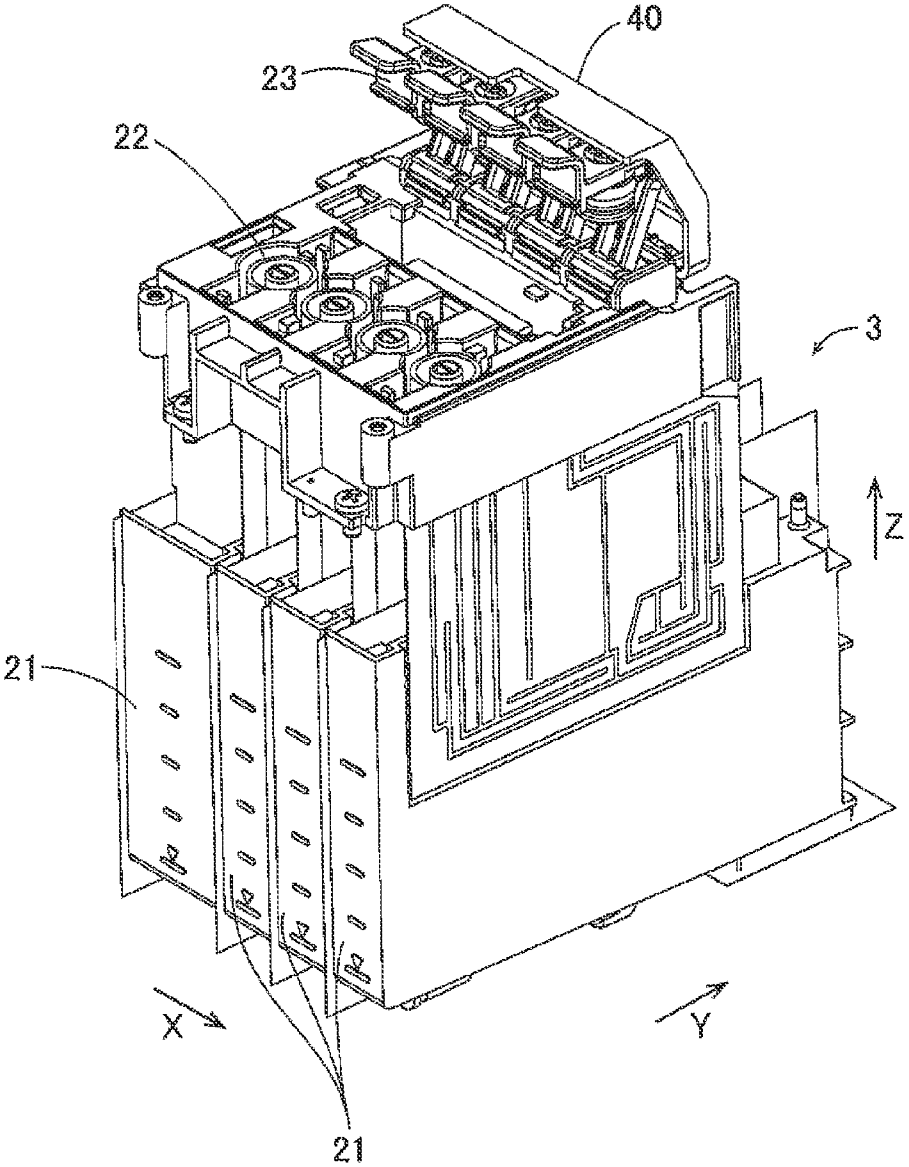
FIG. 15 is a perspective view illustrating the liquid containing unit of the fourth embodiment when the lid portion and the lid cover are in the open state.

FIGS. 14 and 15 each are a perspective view illustrating the liquid containing unit 3 according to the fourth embodiment. According to FIG. 14, the lid portion 23 is in the closed state, and the lid cover 40 is raised and in the open state. According to FIG. 15, the lid portion 23 and the lid cover 40 are both in the open state. As illustrated in FIG. 14, the lid cover 40 has a tip wall 43 having an eaves shape at a tip. Similarly to the left and right side walls 41, the tip wall 43 projects forward when the lid cover 40 is in the open state. According to the lid cover 40, the left and side walls 41 are joined to the tip wall 43 therebetween so as to form a space surrounded by the left and right side walls 41 and the tip wall 43.

Figure 16:
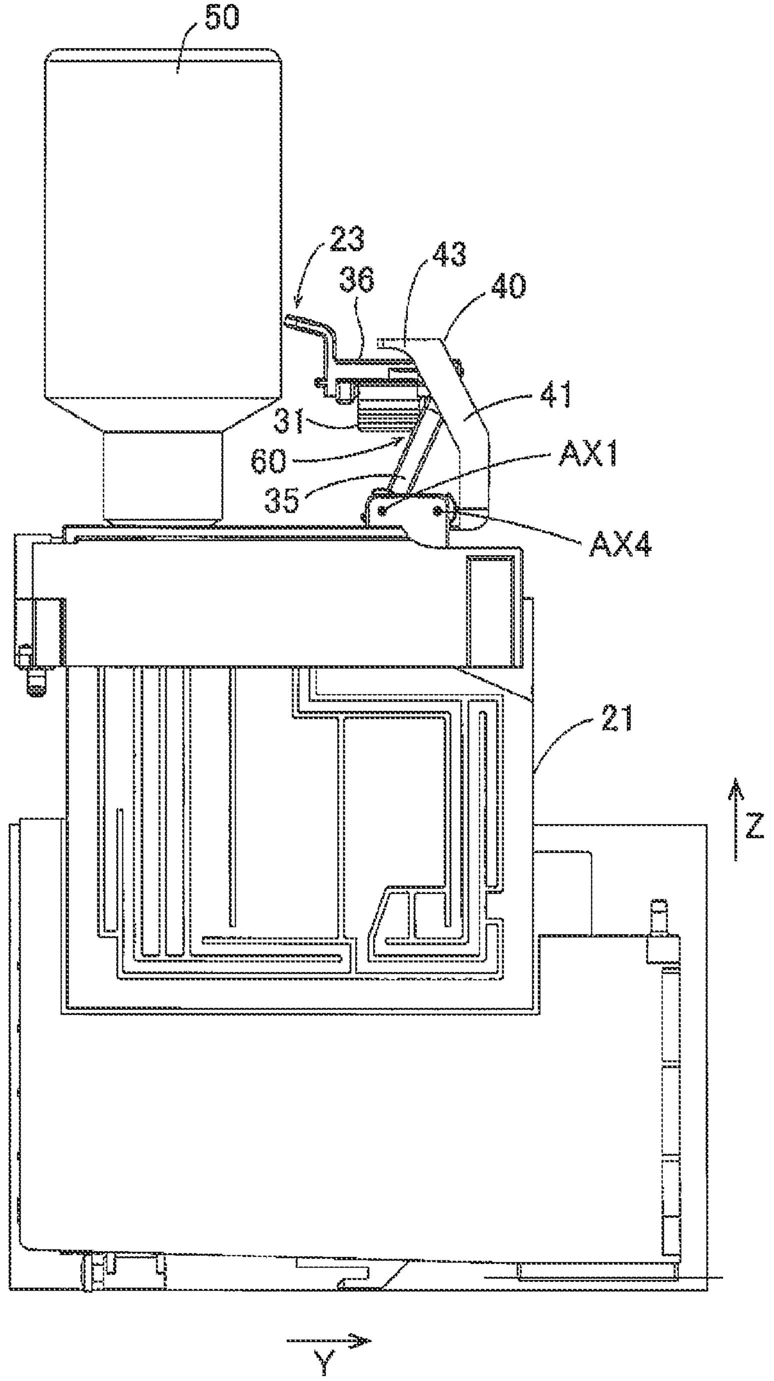
FIG. 16 is a view illustrating a relationship between the lid cover and the lid portion of the fourth embodiment.

FIG. 16 is a view illustrating a relationship between the lid cover 40 and the lid portion 23 when viewed in a direction directing the axial direction of the turning axis AX1. Similarly to FIG. 15, in FIG. 16, the lid portion 23 and the lid cover 40 are both in the open state. In addition, in FIG. 16, the bottle 50 is raised upside down at a position of the inlet 22 corresponding to the containing portion 21. The bottle 50 contains a refill liquid such as ink, and as the bottle 50 is raised as illustrated in FIG. 16, the containing portion 21 is filled with the liquid from the bottle 50 through the inlet 22. In FIG. 16, the lid portion 23 in the open state is retreated to a position where the lid portion 23 does not interfere with the raised bottle 50.

As is understood from FIGS. 15 and 16, in the fourth embodiment, the lid portion 23 in the open state is held in the bent orientation in the space surrounded by the side walls 41 and the tip wall 43 of the lid cover 40. In the lid portion 23 in the bent orientation, the first member 35 is raised while being inclined backward. In addition, since the second member 36 is regulated to be located at a position lower than the tip wall 43 of the lid cover 40, the second member 36 is held to be substantially horizontal. Therefore, in FIGS. 15 and 16, in the lid portion 23 in the open state, the projecting direction D of the insertion portion 31 is vertically downward or substantially vertically downward. In FIGS. 15 and 16, the lid portion 23 in the open state may be supported from behind by the lid cover 40, or the orientation of the lid portion 23 may be held by a prescribed stopper other than the lid cover 40.

In addition, as illustrated in FIG. 16, the orientation of the lid portion 23 in the bent orientation may be held in a state in which part of the tip of the insertion portion 31 is in contact with the first member 35. As described above, according to the fourth embodiment, when the lid portion 23 is in the open state, the projecting direction D of the insertion portion 31 is held to direct downward. Therefore, during operation of pouring the liquid through the inlet 22, compared to a case where the insertion portion is simply located near the inlet or faces forward as in the related art, the hand of the user hardly touches the insertion portion 31, and it is easy to avoid making the hand of the user get dirty.

The regulating portion that regulates the orientation of the second member 36 such that the projecting direction D directs downward is not limited to the regulating portion 37, and the lid cover 40 illustrated in FIGS. 15 and 16 also corresponds to the regulating portion described above. Moreover, without providing the lid cover 40, by providing a member having an eaves shape corresponding to the tip wall 43 at a prescribed position of the recording unit 1 where the liquid containing unit 3 is disposed, the member may be considered as the regulating portion. In addition, the lid portion 23 in the open state is sufficient as long as the bent orientation as illustrated in FIGS. 15 and 16 can be held. Therefore, the first member 35 and the second member 36 of the lid portion 23 may be joined by an extendable member such as a spring so that both the straight line orientation and the bent orientation can be held by expansion and contraction of the extendable member. Such an extendable member is also a kind of the regulating portion.

Fifth Embodiment

Figure 17:
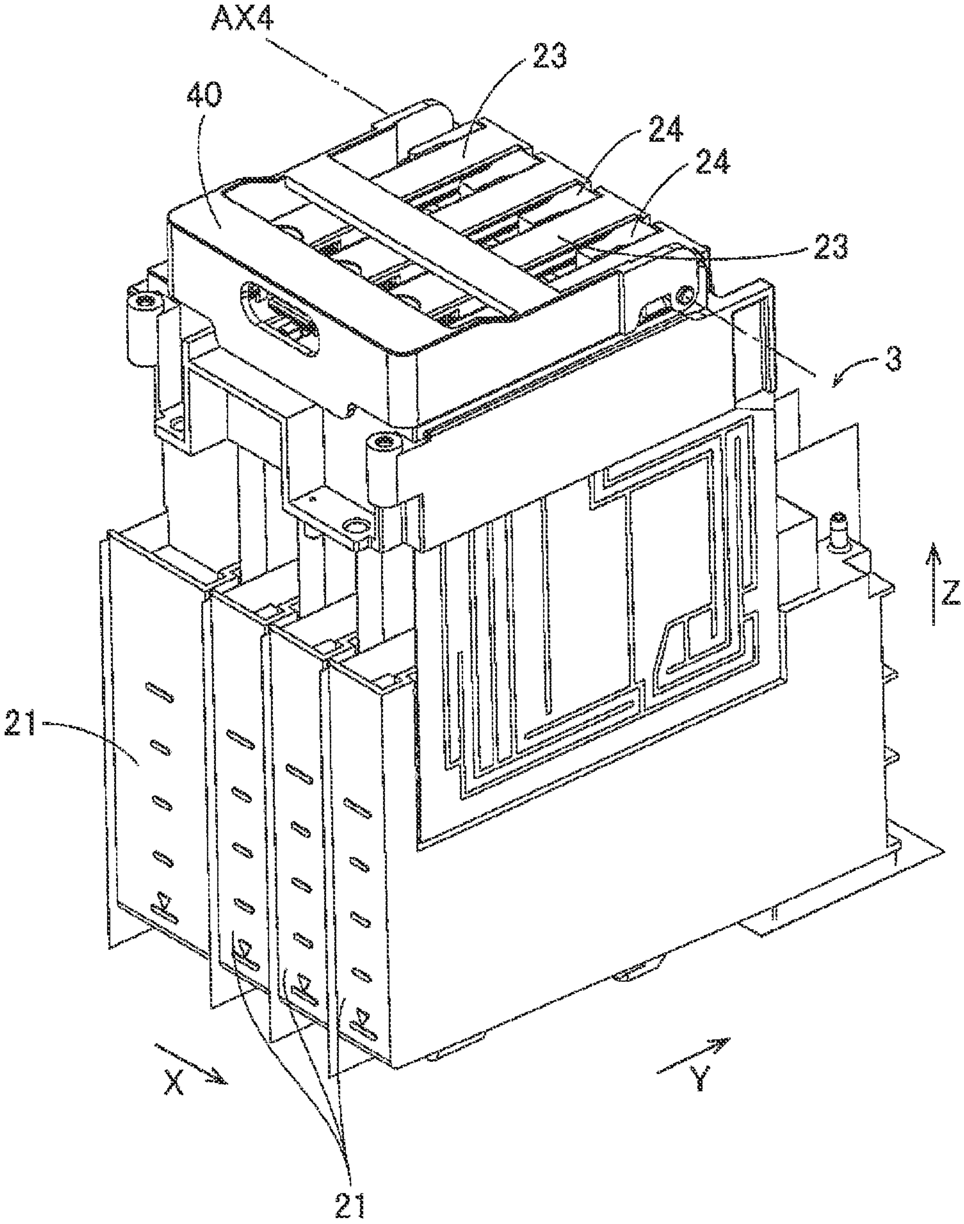
FIG. 17 is a perspective view illustrating a liquid containing unit of a fifth embodiment when a lid portion and a lid cover are in the closed state.

The lid portion 23 may be configured to move in parallel with a direction intersecting the projecting direction D. FIG. 17 is a perspective view illustrating the liquid containing unit 3 according to the fifth embodiment. According to FIG. 17, the lid portion 23 and the lid cover 40 are both in the closed state. The lid portion 23 of the fifth embodiment is configured to move in the Y direction, that is, forward and backward.

Figure 18:
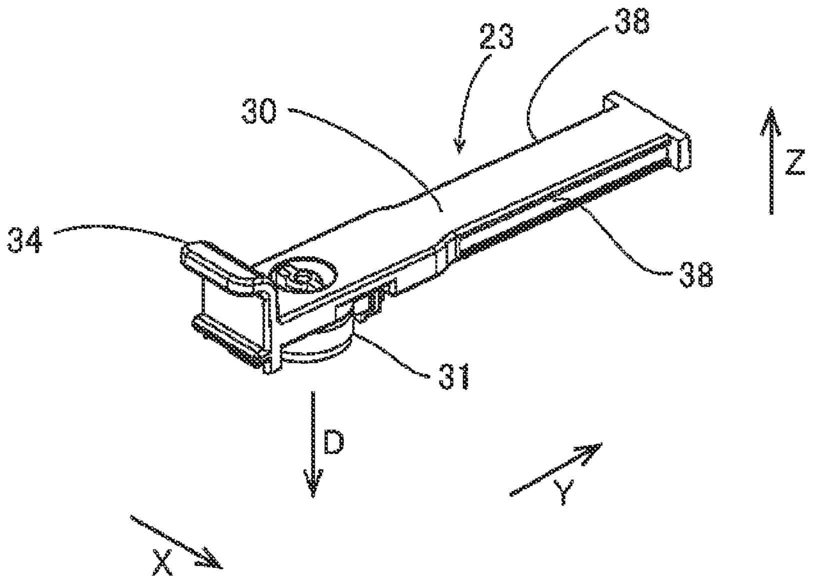
FIG. 18 is a perspective view illustrating the lid portion of the fifth embodiment.

FIG. 18 is a perspective view illustrating the lid portion 23 according to the fifth embodiment. The lid portion 23 of the fifth embodiment has a groove 38 so as to move in a direction intersecting the projecting direction D. That is, the lid portion 23 forms the groove 38 on each of the left and right side surfaces of the lever 30 in a longitudinal direction of the lever 30.

As illustrated in FIG. 17, a projection 24 is disposed above the containing portion 21 and behind the position of the inlet 22, between the lid portions 23 arranged in the X direction. The left and right projections 24 are fitted into the left and right grooves 38, as a result of which each lid portion 23 can slide and move forward and backward with respect to the projections 24.

Figure 19:
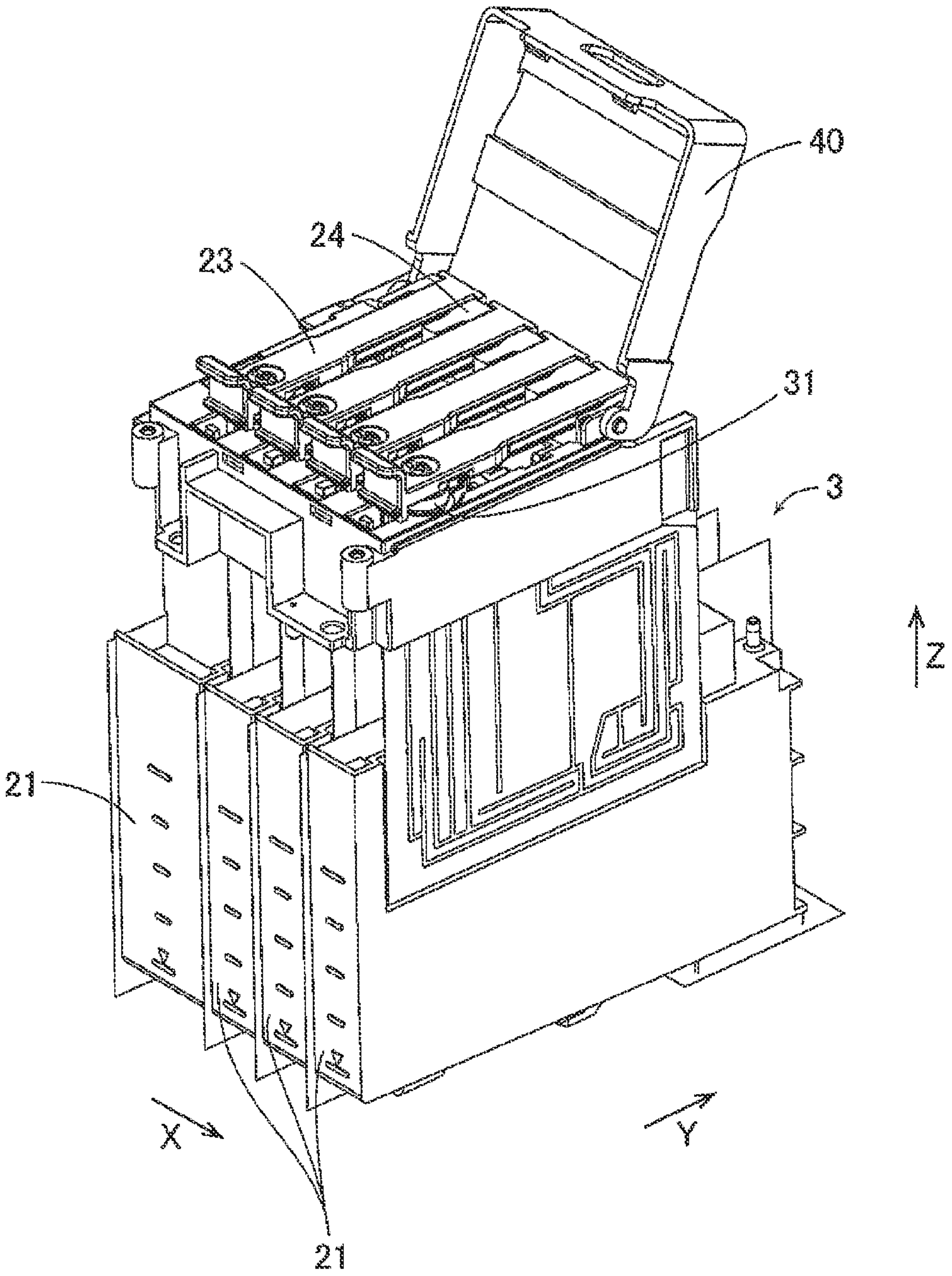
FIG. 19 is a perspective view illustrating the liquid containing unit of the fifth embodiment when the lid portion is in the closed state and the lid cover is in the open state.
Figure 20:
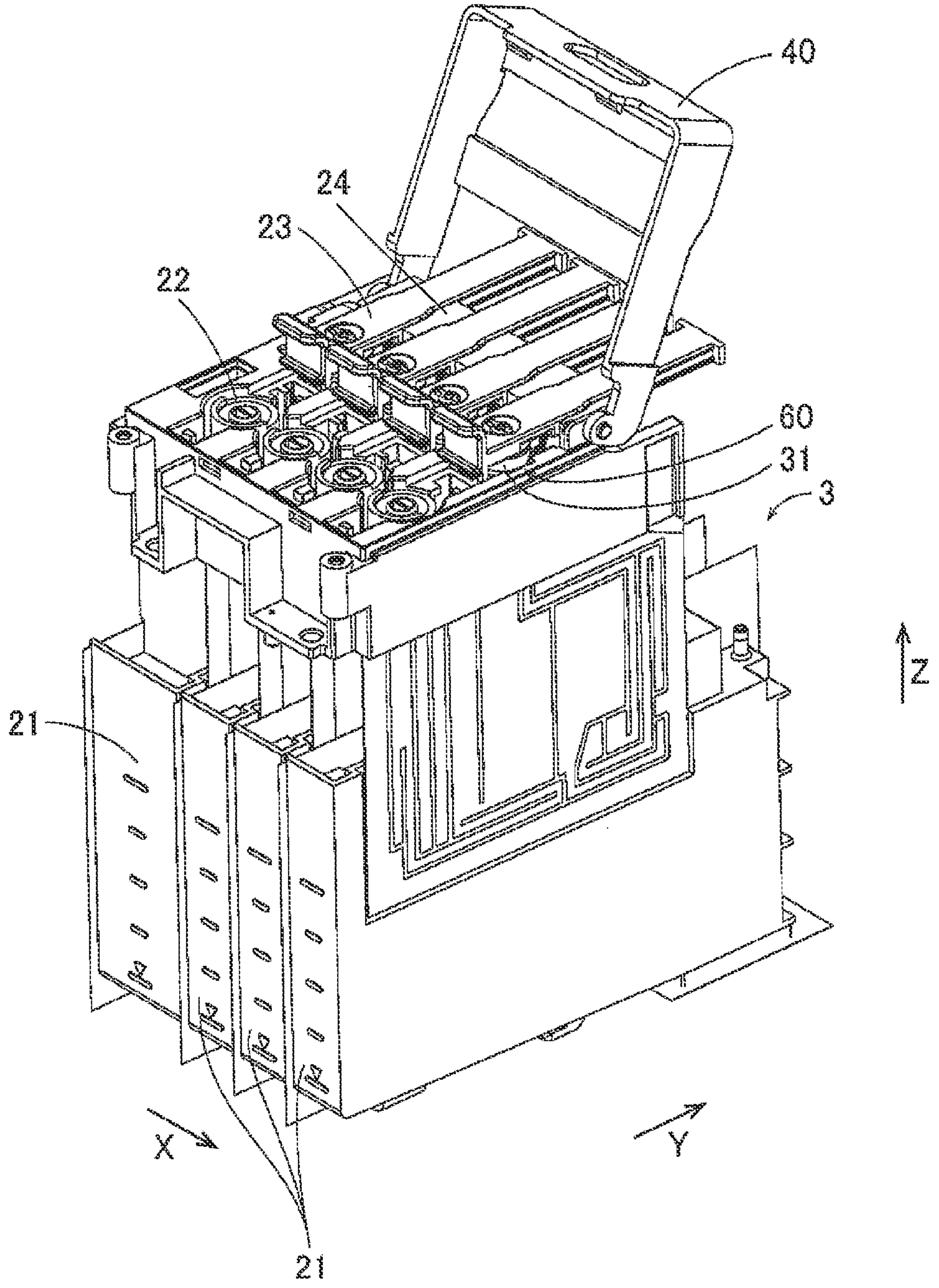
FIG. 20 is a perspective view illustrating the liquid containing unit of the fifth embodiment when the lid portion and the lid cover are in the open state.

FIGS. 19 and 20 each are a perspective view illustrating the liquid containing unit 3 according to the fifth embodiment. According to FIG. 19, the lid portion 23 is in the closed state, and the lid cover 40 is raised and in the open state. According to FIG. 20, the lid portion 23 and the lid cover 40 are both in the open state. That is, as the user moves the lid portion 23 in the closed state as illustrated in FIG. 19 backward so as to hold the lid portion 23 in the open state as illustrated in FIG. 20. When the lid portion 23 is displaced from the open state to the closed state, the lid portion 23 is moved forward. As is understood from FIGS. 19 and 20, in the fifth embodiment, the projecting direction D of the insertion portion 31 always directs vertically downward or substantially vertically downward. According to the fifth embodiment described above, during operation in which the liquid is poured through the inlet 22 while the lid portion 23 is in the open state, a contact of the hand of the user with the insertion portion 31 is suppressed, and thus the hand of the user does not get dirty.

The movement of the lid portion 23 in the fifth embodiment does not have to be limited to the forward and backward movement. For an attaching and removing action of the insertion portion 31 with respect to the inlet 22, it is better to have some allowance in the range of movement of the lid portion 23. Therefore, the range of movement of the lid portion 23 may expand up and down, and left and right within a range necessary for the attaching and removing action while being regulated in the front-back direction by the grooves 38 and the projections 24.

Sixth Embodiment

The lid portion 23 is configured to turn around the turning axis AX1 intersecting the projecting direction D between the closed state and the open state. Moreover, the turning axis AX1 may be configured to turn around a turning axis AX3 intersecting the turning axis AX1. The turning axis AX3 corresponds to a third turning axis.

Figure 21:
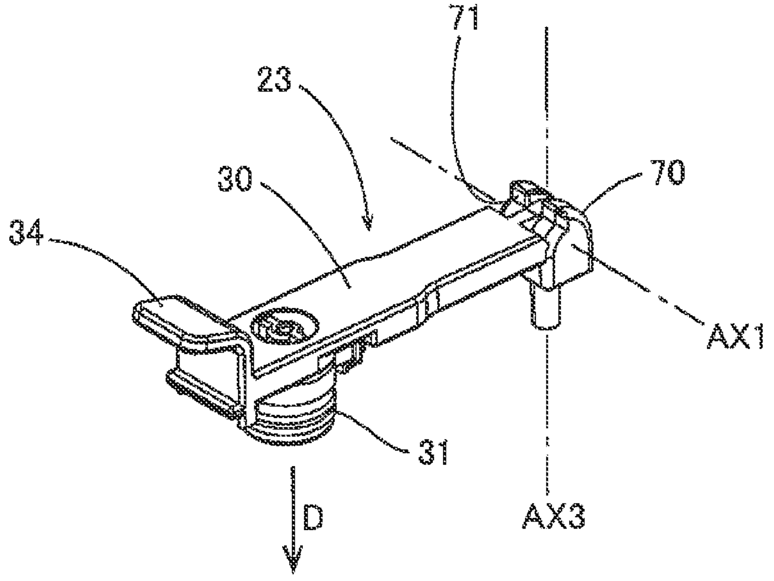
FIG. 21 is a perspective view illustrating a lid portion of a sixth embodiment.
Figure 22:
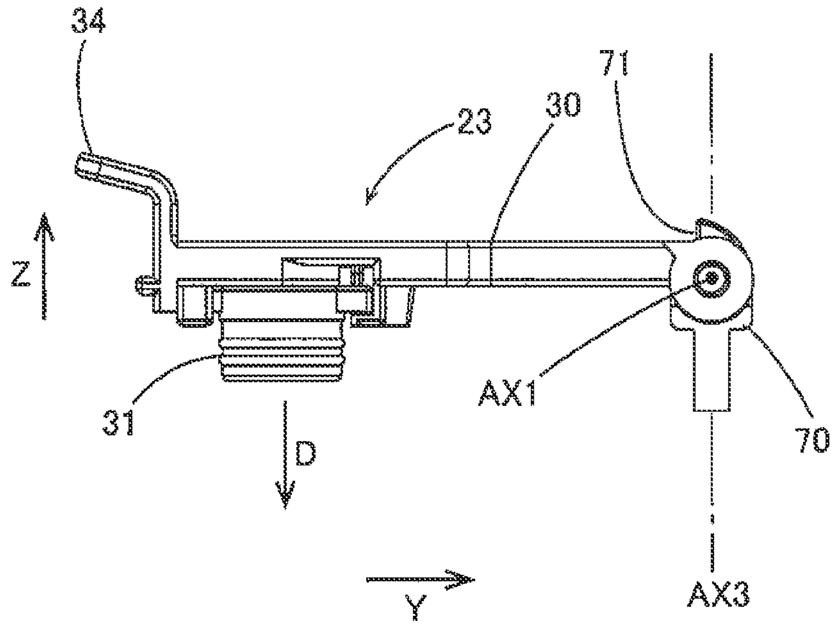
FIG. 22 is a view illustrating the lid portion of the sixth embodiment when viewed in a direction directing an axial direction of a first turning axis.
Figure 23:
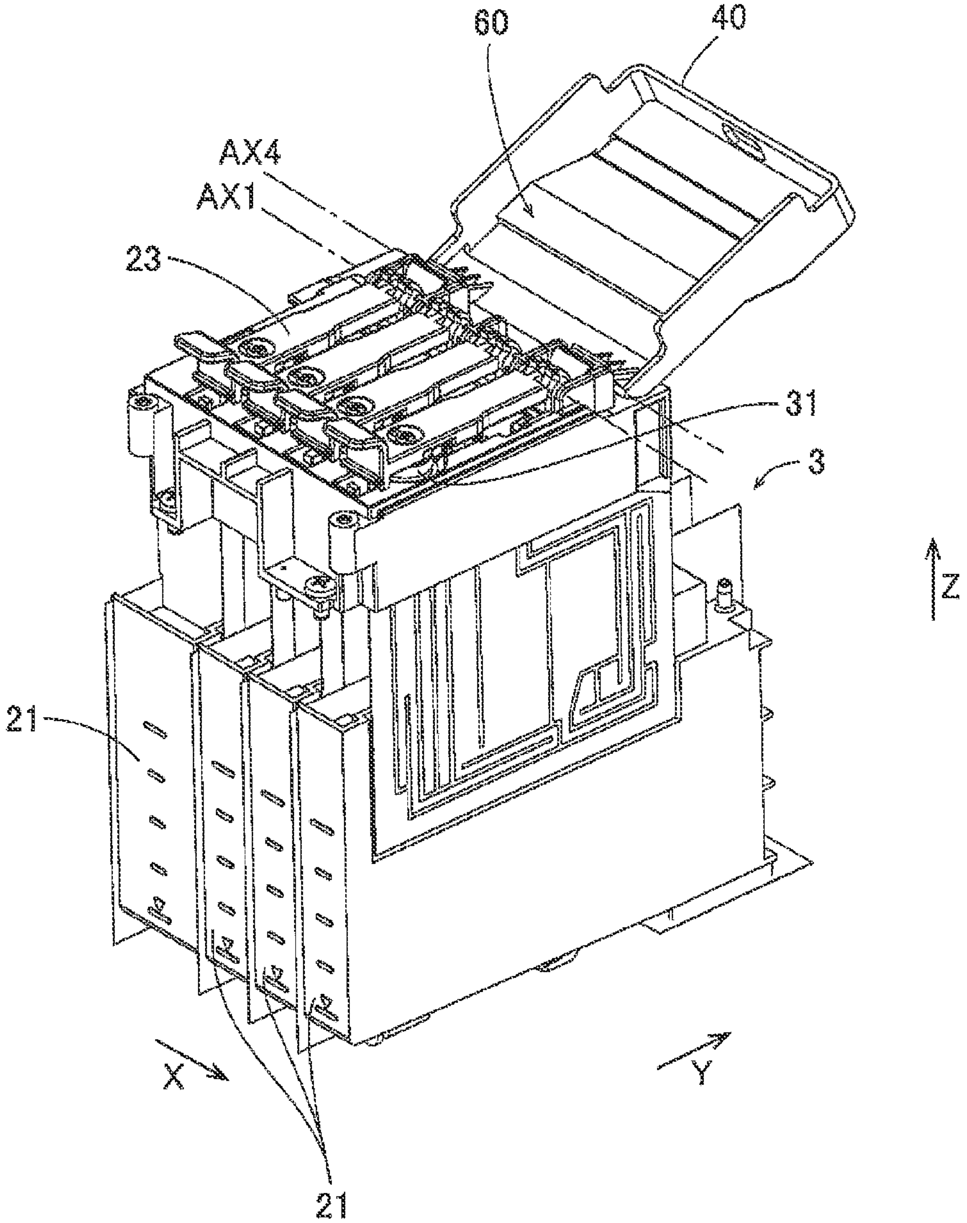
FIG. 23 is a perspective view illustrating a liquid containing unit of the sixth embodiment when the lid portion is in the closed state and a lid cover is in the open state.

FIG. 21 is a perspective view illustrating the lid portion 23 according to the sixth embodiment. FIG. 22 is a view illustrating the lid portion 23 according to the sixth embodiment when viewed in a direction directing the axial direction of the turning axis AX1. According to FIGS. 21 and 22, in the lid portion 23, one end on a side opposite to the tip of the lever 30 is supported by a rotation supporting portion 70 by the turning axis AX1. The rotation supporting portion 70 is configured to rotate around the turning axis AX3 orthogonal to the turning axis AX1. The turning axis AX3 may be considered to be parallel to the Z direction. Therefore, the lid portion 23 is configured to turn around the turning axis AX1 and is further configured to turn around the turning axis AX3 together with the rotation supporting portion 70.

The rotation supporting portion 70 has a regulating portion 71 that interferes with the lever 30 that turns around the turning axis AX1. When the lid portion 23 turns around the turning axis AX1 from an orientation in which the projecting direction D directs vertically downward, a prescribed portion of the lever 30 interferes with the regulating portion 71 before the projecting direction D faces the horizontal direction, and the lid portion 23 cannot turn around the turning axis AX1 any further.

Figure 24:
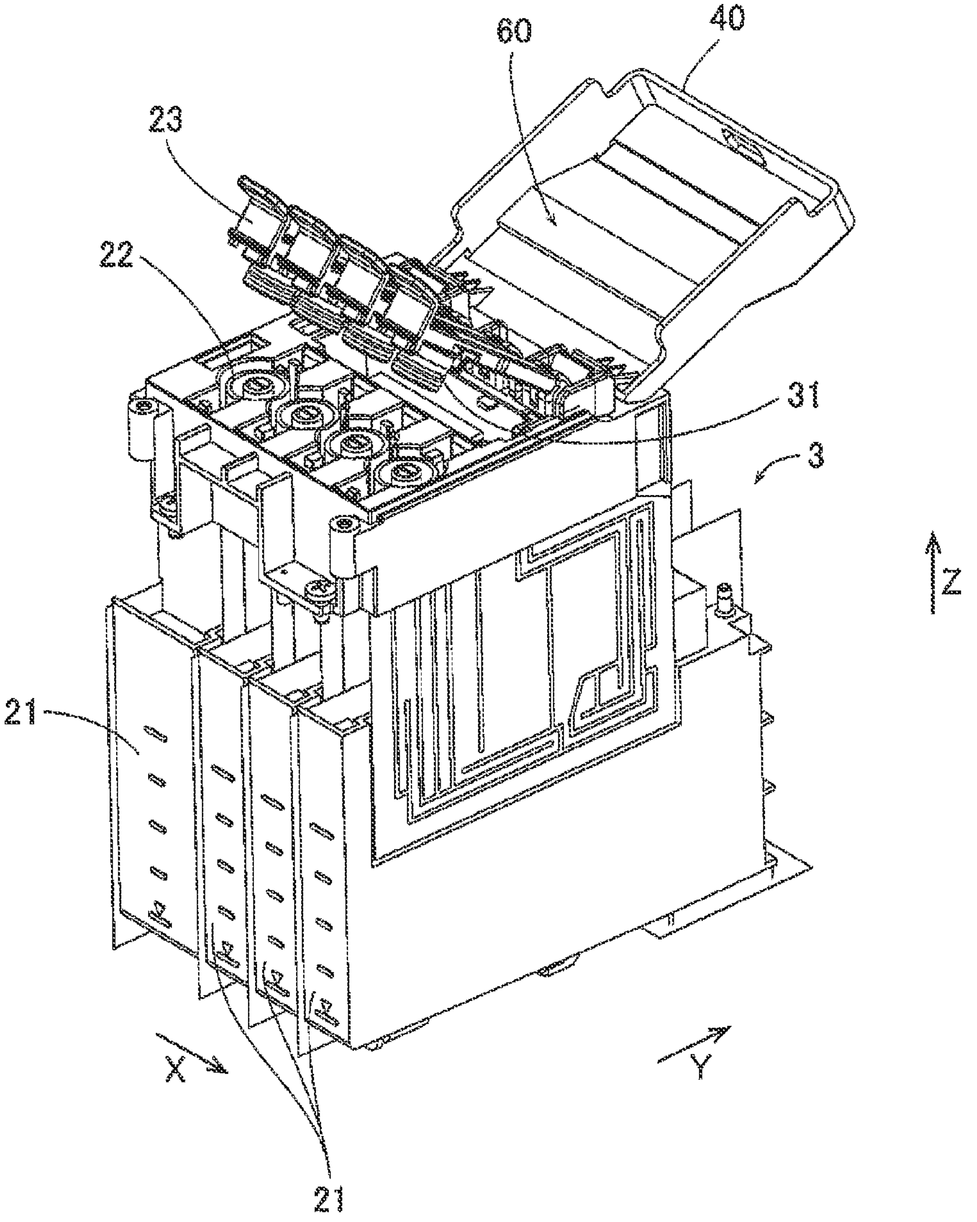
FIG. 24 is a perspective view illustrating the liquid containing unit of the sixth embodiment when the lid portion is in a first open state and the lid cover is in the open state.
Figure 25:
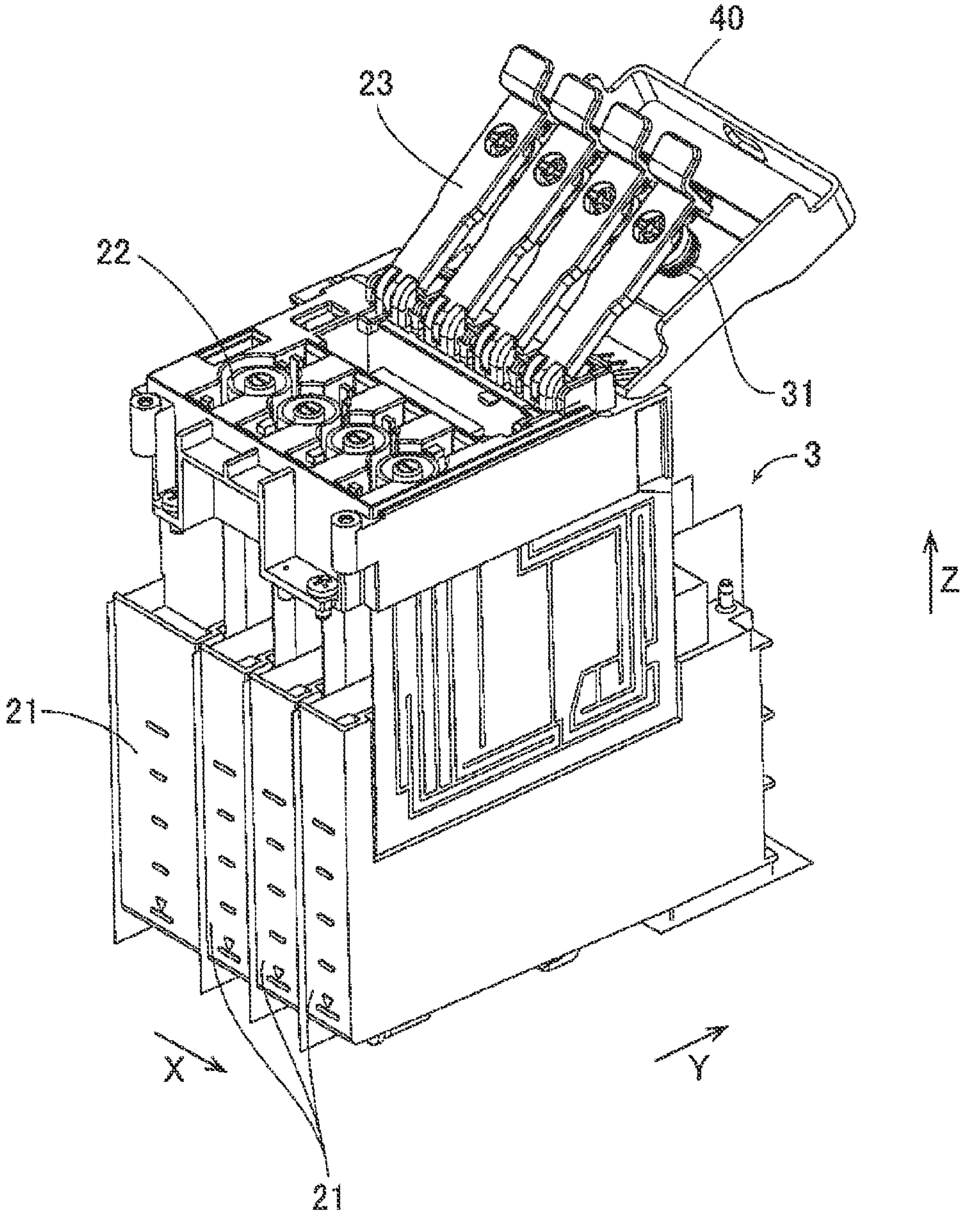
FIG. 25 is a perspective view illustrating the liquid containing unit of the sixth embodiment when the lid portion is in a second open state and the lid cover is in the open state.
Figure 26:
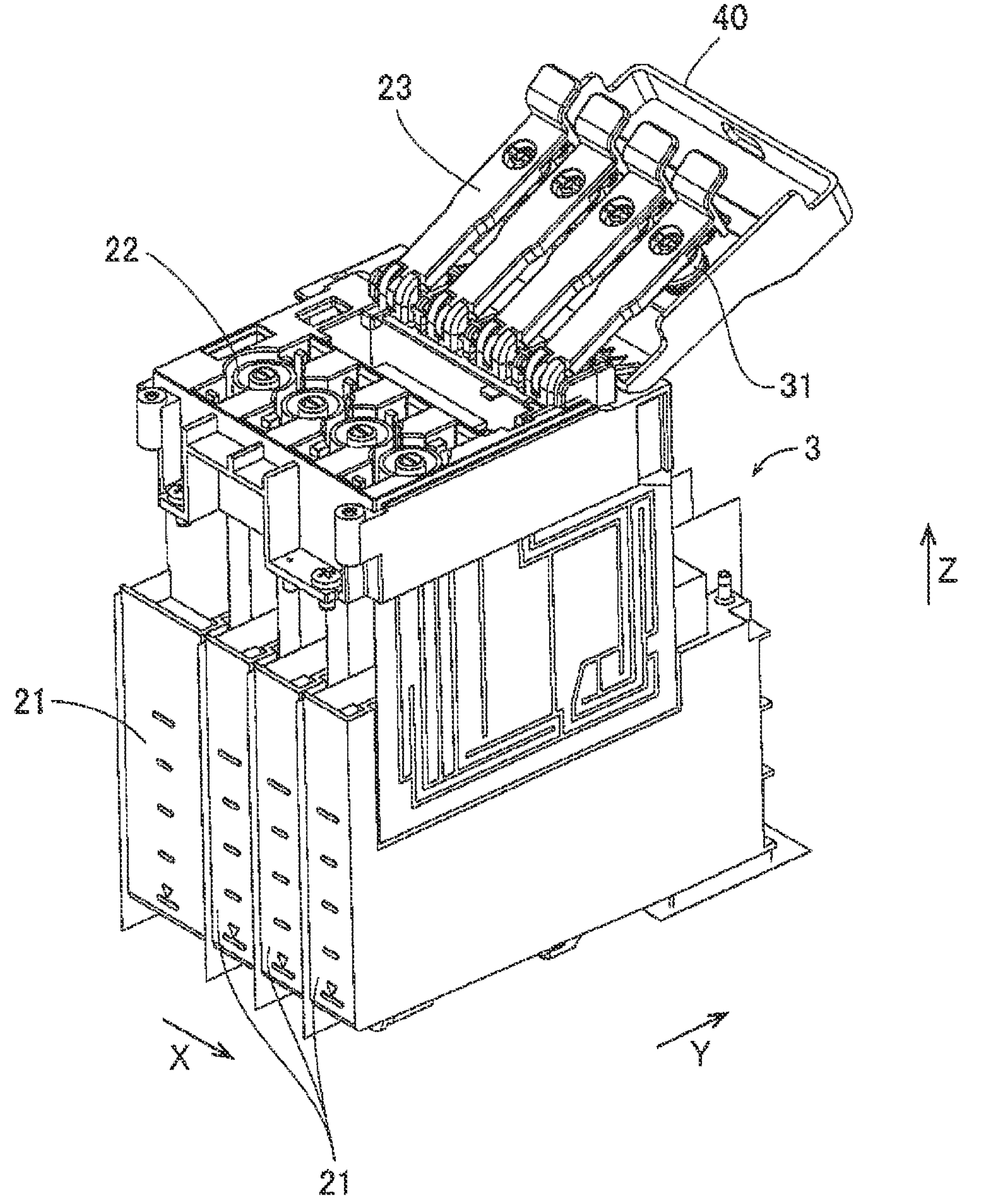
FIG. 26 is a perspective view illustrating the liquid containing unit of the sixth embodiment when the lid portion is in a third open state and the lid cover is in the open state.

FIGS. 23, 24, 25, and 26 each are a perspective view illustrating the liquid containing unit 3 according to the sixth embodiment. According to FIG. 23, the lid portion 23 is in the closed state. In addition, in any of FIGS. 23 to 26, the lid cover 40 is in the open state in which the lid cover 40 is inclined backward further than the orientation in which the lid cover 40 is vertically raised. According to FIGS. 24 to 26, the lid portion 23 is in the open state. The open state of the lid portion 23 in FIG. 24 is referred to as a first open state, the open state of the lid portion 23 in FIG. 25 is referred to as a second open state, the open state of the lid portion 23 in FIG. 26 is referred to as a third open state, separately.

The user turns the lid portion 23 in the closed state around the turning axis AX1 such that the lid portion 23 enters the first open state illustrated in FIG. 24. The first open state may be considered to be a state in which turning of the lid portion 23 is regulated by the regulating portion 71. Next, the user rotates the lid portion 23 in the first open state approximately 180° around the turning axis AX3 such that the lid portion 23 enters the second open state illustrated in FIG. 25. Then, the user lowers the lid portion 23 as it is. As a result, as illustrated in FIG. 26, the lid portion 23 enters the third open state while the insertion portion 31 is brought into contact with a prescribed position of the lid cover 40. In order to cause the lid portion 23 to enter the closed state, the lid portion 23 may be displaced from the third open state to the second open state, the first open state, and the closed state.

As is understood from FIGS. 23 to 26, in the sixth embodiment, the projecting direction D of the insertion portion 31 directs downward in any timing of the closed state to the third open state of the lid portion 23. According to the sixth embodiment described above, during operation in which the liquid is poured through the inlet 22 in the third open state of the lid portion 23, a contact of the hand of the user with the insertion portion 31 is suppressed, and the hand of the user does not get dirty. Note that in FIGS. 23 to 26, the lid cover 40 may be further lowered so as to be substantially horizontal, whereby the projecting direction D of the insertion portion 31 directs vertically downward in the third open state of the lid portion 23.

5. Summary

As described above, according to the above embodiment, the liquid container 20 configured to be refilled with a liquid from outside includes the containing portion 21 that contains the liquid, the inlet 22 that is in communication with the containing portion 21 and through which the liquid is poured, the lid portion 23 that has the insertion portion 31 to be inserted into the inlet 22 and is configured be displaced between the closed state in which the insertion portion 31 closes the inlet 22 and the open state in which the insertion portion 31 is separated from the inlet 22, and when the lid portion 23 is in the open state, the orientation of the lid portion 23 is configured to be held to cause the projecting direction D in which the insertion portion 31 projects in the lid portion 23 to direct downward.

According to the configuration, when the lid portion 23 is in the open state, the orientation of the lid portion 23 is configured to be held such that the projecting direction D of the insertion portion 31 directs downward. Therefore, during operation in which the user pours the liquid through the inlet 22, a contact of the hand of the user with the insertion portion 31 so as to make the hand of the user get dirty is suppressed. More specifically, when the user supplies the liquid, the user removes the insertion portion 31 from the inlet 22 and installs the bottle 50 containing a refill liquid into the inlet 22. When the bottle 50 is raised with respect to the inlet 22, the insertion portion 31 that has been removed from the inlet 22 is hidden behind the bottle and is hardly seen from the user. Therefore, in the related art, the hand of the user holding the bottle often touches the insertion portion 31 and gets dirty. In the above embodiment, by making the projecting direction D of the insertion portion 31, of the lid portion 23 in the open state, direct downward, the phenomenon in which the hand of the user gets dirty as described above can be suppressed.

In addition, according to the above embodiment, when the lid portion 23 is in the open state, the projecting direction D may direct vertically downward. According to the configuration, by making the projecting direction D direct vertically downward when the lid portion 23 is in the open state, a contact of the user with the insertion portion 31 can be more strongly suppressed.

In addition, according to the above embodiment, the lid portion 23 may be configured to turn around the first turning axis intersecting the projecting direction D between the closed state and the open state, has the first member 35 configured to turn with respect to the first turning axis, the second member 36 having the insertion portion 31, and the second turning axis interposing between the first member 35 and the second member 36 and parallel to the first turning axis, and the first member 35 and the second member 36 may be configured to turn with respect to the second turning axis. According to the configuration, when the lid portion 23 is caused to enter the open state, the first member 35 is turned around the first turning axis and, at the same time, the second member 36 is bent with respect to the first member 35 using the second turning axis as a boundary, so that the projecting direction D of the insertion portion 31 can be held to direct downward.

In addition, according to the above embodiment, a regulating portion may be further included to regulate an orientation of the second member 36 to cause the projecting direction D to direct downward. According to the configuration, since the regulating portion prevents the projecting direction D of the insertion portion 31 from directing upward, the possibility of the user touching the insertion portion 31 can be further reduced.

In addition, according to the above embodiment, the lid portion 23 may be configured to move in parallel with a direction intersecting the projecting direction D. According to the configuration, when the lid portion 23 is displaced from the closed state to the open state, the lid portion 23 can be displaced while the projecting direction D of the insertion portion 31 is held to direct downward, and thus the possibility of the user touching the insertion portion 31 can be reduced.

In addition, according to the above embodiment, the lid portion 23 may be configured to turn around the first turning axis intersecting the projecting direction D between the closed state and the open state, and the first turning axis may be configured to turn around the third turning axis intersecting the first turning axis. According to the configuration, by combining turning of the lid portion 23 around the first turning axis with turning of the first turning axis around the third turning axis, in the open state of the lid portion 23, the projecting direction D of the insertion portion 31 can be held to direct downward.

The above embodiment discloses not only the liquid container 20, but also a device having the liquid container 20. That is, according to the above embodiment, the recording device 10 including the recording unit 1 that performs recording by ejecting a liquid onto a medium, and any one of the above liquid containers 20 that contains the liquid to be supplied to the recording unit 1 can be understood.

The recording device 10 may have a plurality of liquid containers 20. Therefore, according to the above embodiment, the recording device 10 including the recording unit 1 that performs recording by ejecting a liquid onto a medium, and the liquid containing unit 3 that contains the liquid to be supplied to the recording unit 1, in which the liquid containing unit 3 has the first liquid container and the second liquid container, each of which serves as any one of the above liquid containers 20, and the lid cover 40 that covers the lid portion 23 of the first liquid container and the lid portion 23 of the second liquid container can be understood. According to the configuration, by the lid cover 40, an aesthetic appearance of a portion near a plurality of lid portions 23 can be improved, and incomplete fitting of each lid portion 23 into each inlet 22 can be prevented.

Each liquid container 20 may include an absorbing member 60 that is configured to come into contact with the insertion portion 31 when the lid portion 23 is in the open state. The absorbing member 60 is formed of a material such as sponge that absorbs the liquid. By including the absorbing member 60 described above, the absorbing member 60 absorbs the liquid attached to the insertion portion 31, and a surrounding area can be prevented from getting dirty.

Specifically, as indicated by the arrow in FIG. 16, the absorbing member 60 may be provided at a prescribed position of the first member 35 with which the insertion portion 31 can come into contact in the open state of the lid portion 23. Alternatively, as indicated by the arrow in FIG. 20, the absorbing member 60 may be provided at a prescribed position facing the insertion portion 31 in the open state of the lid portion 23. Alternatively, as indicated by the arrows in FIGS. 23 and 24, the absorbing member 60 may be provided at a prescribed position of the lid cover 40 with which the insertion portion 31 can come into contact in the third open state of the lid portion 23.

As described above, the lid cover 40 is configured to turn around the fourth turning axis intersecting the projecting direction D, that is, the turning axis AX4. In addition, a configuration, when the lid portion 23 is in the open state, the insertion portion 31 does not project further than the lid cover 40 when viewed in the axial direction of the fourth turning axis may be adopted. That is, a configuration in which the projecting direction D of the insertion portion 31 is held to direct downward may be combined with a configuration in which the lid cover 40 is considered to be the cover portion.

Figure 27:
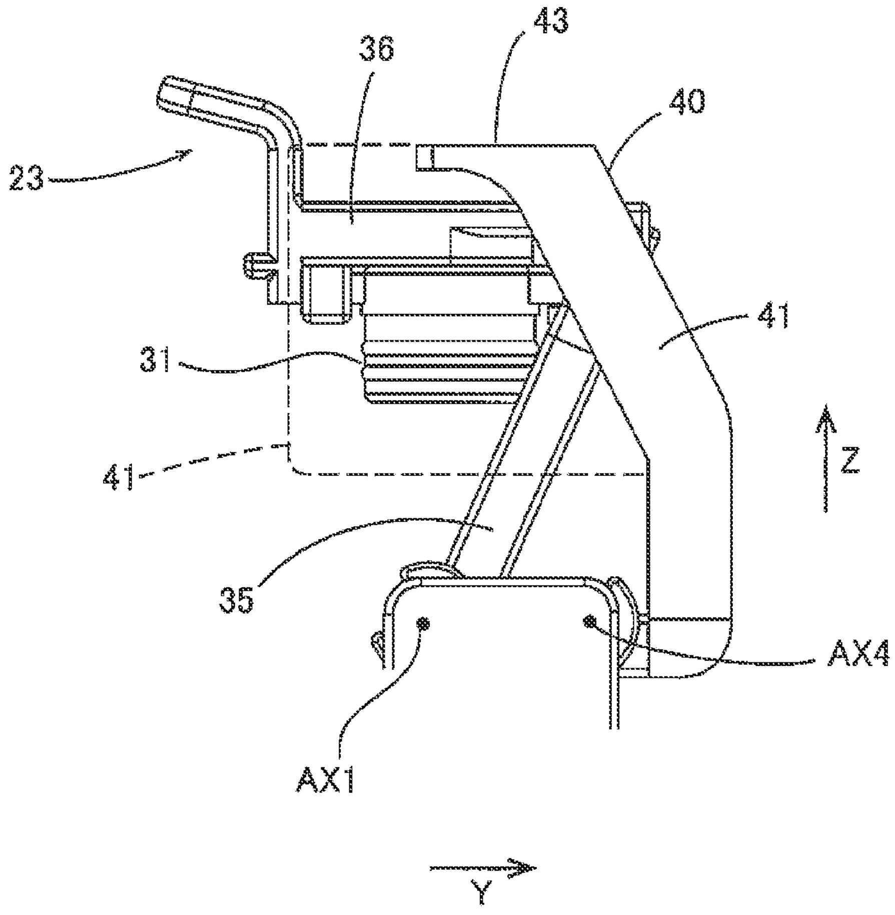
FIG. 27 is a view illustrating an example of a relationship between the lid portion and a side wall of the lid cover of the fourth embodiment.

An example will be described with reference to the fourth embodiment. FIG. 27 illustrates the lid portion 23 illustrated in FIG. 16 and a surrounding area thereof. The lid cover 40 and each side wall 41 may have a shape that also covers the area indicated by the dashed line in FIG. 27. By having such a shape, in the fourth embodiment, the lid cover 40 covers the insertion portion 31 when the lid portion 23 is in the open state, and a contact of the user with the insertion portion 31 can be more strongly suppressed. Although not illustrated, in the fifth embodiment, when the lid portion 23 is in the open state, part of the lid cover 40 may cover the insertion portion 31 when viewed in an axial direction of the turning axis AX4. Similarly, in the sixth embodiment, when the lid portion 23 is in the third open state, the side wall 41 of the lid cover 40 may cover the insertion portion 31 when viewed in the axial direction of the turning axis AX4.

What is claimed is:

1. A liquid container configured to be refilled with a liquid from outside, the liquid container comprising:
- a containing portion that contains the liquid;
- an inlet that is in communication with the containing portion and through which the liquid is poured;
- a lid portion that has an insertion portion to be inserted into the inlet and is configured to turn around a turning axis between a closed state in which the insertion portion closes the inlet and an open state in which the insertion portion is separated from the inlet;
- a cover portion that covers the insertion portion in the open state; and
- a lock portion that holds the lid portion in the closed state, wherein
- when the lid portion is in the open state, the insertion portion does not project further than the cover portion when viewed in an axial direction of the turning axis.

2. The liquid container according to claim 1, wherein the cover portion is provided in the lid portion.

3. The liquid container according to claim 2, wherein when the lid portion is in the closed state, the insertion portion does not project further than the cover portion when viewed in the axial direction.

4. The liquid container according to claim 2, wherein when the lid portion is in the closed state, the insertion portion projects further than the cover portion when viewed in the axial direction.

5. The liquid container according to claim 4, wherein
- the cover portion is provided in the lid portion with a biasing member interposed between the cover portion and the lid portion, and
- configured to be displaced by expansion and contraction of the biasing member between a first position where the insertion portion does not project further than the cover portion and a second position where the insertion portion projects further than the cover portion, and
- the biasing member biases the cover portion toward the first position.

6. A recording device comprising:
- a recording unit that performs recording by ejecting a liquid onto a medium; and the liquid container according to claim 1 that contains the liquid to be supplied to the recording unit.

7. A recording device comprising:
- a recording unit that performs recording by ejecting a liquid onto a medium; and
- a liquid containing unit that contains the liquid to be supplied to the recording unit, wherein the liquid containing includes a first liquid container and a second liquid container, wherein the first liquid container and the second liquid container are each a liquid container according to claim 1; and
- a lid cover that covers the lid portion of the first liquid container and the lid portion of the second liquid container.

8. The liquid container according to claim 1, wherein the cover portion is configured to open and close with respect to the containing portion by turning around an axis parallel to the turning axis.

9. A recording device comprising:
- a recording unit that performs recording by ejecting a liquid onto a medium;
- a plurality of liquid containers that contains the liquid to be supplied to the recording unit; and
- a cover portion that covers the plurality of liquid containers, wherein
- each of the liquid containers has
- a containing portion that contains the liquid,
- an inlet that is in communication with the containing portion and receives pouring of the liquid, and
- a lid portion that is configured to turn around a turning axis between a closed state in which the inlet is closed by inserting an insertion portion into the inlet and an open state in which the insertion portion is separated from the inlet,
- a lock portion that holds the lid portion in the closed state,
- the cover portion is configured to turn around an axis parallel to the turning axis, and when the lid portion is in the open state, the insertion portion does not project further than the cover portion when viewed in an axial direction of the turning axis.

10. A liquid container configured to be refilled with a liquid from outside, the liquid container comprising:
- a containing portion that contains the liquid;
- an inlet that is in communication with the containing portion and through which the liquid is poured; and
- a lid portion that has an insertion portion to be inserted into the inlet and is configured to be displaced between a closed state in which the insertion portion closes the inlet and an open state in which the insertion portion is separated from the inlet,
- a lock portion that holds the lid portion in the closed state, wherein
- when the lid portion is in the open state, an orientation of the lid portion is configured to be held to cause a projecting direction in which the insertion portion projects in the lid portion to direct downward.

11. The liquid container according to claim 10, wherein when the lid portion is in the open state, the projecting direction directs vertically downward.

12. The liquid container according to claim 10, wherein
- the lid portion is configured to turn around a first turning axis intersecting the projecting direction between the closed state and the open state, and has
  - a first member configured to turn with respect to the first turning axis,
  - a second member having the insertion portion, and
  - a second turning axis interposed between the first member and the second member and parallel to the first turning axis, and
- the first member and the second member are configured to turn with respect to the second turning axis.

13. The liquid container according to claim 12, further comprising a regulating portion that regulates an orientation of the second member to cause the projecting direction to direct downward.

14. The liquid container according to claim 10, wherein the lid portion is configured to move in parallel with a direction intersecting the projecting direction.

15. The liquid container according to claim 10, wherein the lid portion is configured to turn around a first turning axis intersecting the projecting direction between the closed state and the open state, and the first turning axis is configured to turn around a third turning axis intersecting the first turning axis.

16. The liquid container according to claim 10, further comprising an absorbing member that is configured to come into contact with the insertion portion when the lid portion is in the open state.

17. A recording device comprising:

a recording unit that performs recording by ejecting a liquid onto a medium; and the liquid container according to claim 10 that contains the liquid to be supplied to the recording unit.

18. A recording device comprising:

a recording unit that performs recording by ejecting a liquid onto a medium; and a liquid containing unit that contains the liquid to be supplied to the recording unit, wherein the liquid containing unit includes a first liquid container and a second liquid container, wherein the first liquid container and the second liquid container are each a liquid container according to claim 10; and a lid cover that covers the lid portion of the first liquid container and the lid portion of the second liquid container.

19. The recording device according to claim 18, wherein the lid cover is configured to turn around a fourth turning axis intersecting the projecting direction, and when the lid portion is in the open state, the insertion portion does not project further than the lid cover when viewed in an axial direction of the fourth turning axis.

* * * * *